(12) United States Patent
Kitagawa et al.

(10) Patent No.: US 6,833,845 B2
(45) Date of Patent: Dec. 21, 2004

(54) IMAGE OBJECT CONTENT GENERATION DEVICE AND PADDING DEVICE

(75) Inventors: Daisaku Kitagawa, Neyagawa (JP); Yoshiyuki Mochizuki, Suita (JP); Tadashi Kobayashi, Ootu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 457 days.

(21) Appl. No.: 09/983,398

(22) Filed: Oct. 24, 2001

(65) Prior Publication Data

US 2002/0051007 A1 May 2, 2002

(30) Foreign Application Priority Data

Oct. 27, 2000 (JP) ......................................... 2000-328553

(51) Int. Cl.[7] .......................... G09G 5/373; H04N 9/74; G06T 3/40
(52) U.S. Cl. ........................ 345/667; 345/611; 345/640; 348/580; 348/597
(58) Field of Search ................................ 345/611, 612, 345/666–671, 640; 348/240, 580–582, 404.1, 597; 382/298–300, 250; 358/1.2, 451, 528

(56) References Cited

U.S. PATENT DOCUMENTS 4,689,681 A * 8/1987 Jackson ..................... 348/590
5,369,735 A * 11/1994 Thier et al. ................. 345/423
5,912,710 A * 6/1999 Fujimoto .................... 348/445
5,990,956 A * 11/1999 Lee .......................... 348/404.1

FOREIGN PATENT DOCUMENTS

JP     10-210470     8/1998

* cited by examiner

Primary Examiner—Jeffery A. Brier
(74) Attorney, Agent, or Firm—Wenderoth, Lind & Ponack, L.L.P.

(57) ABSTRACT

An image object content generation device has a key generation unit that generates a key that is a reference for distinguishing an object pixel from a background pixel per pixel of an inputted image signal, a frame size changing unit that changes a frame size of the image signal, and a low frequency component passing unit that removes high frequency components of the image signal which was processed in the frame size changing unit. The image object generation device also has a pixel compensation unit that performs a padding processing to the image signal which was processed in the low frequency component passing unit by using Low Pass Extrapolation padding algorithm, and a pixel selecting unit that selects one of the Image signal which was processed in the low frequency component passing unit and the image signal which was processed in the pixel compensation unit.

26 Claims, 19 Drawing Sheets

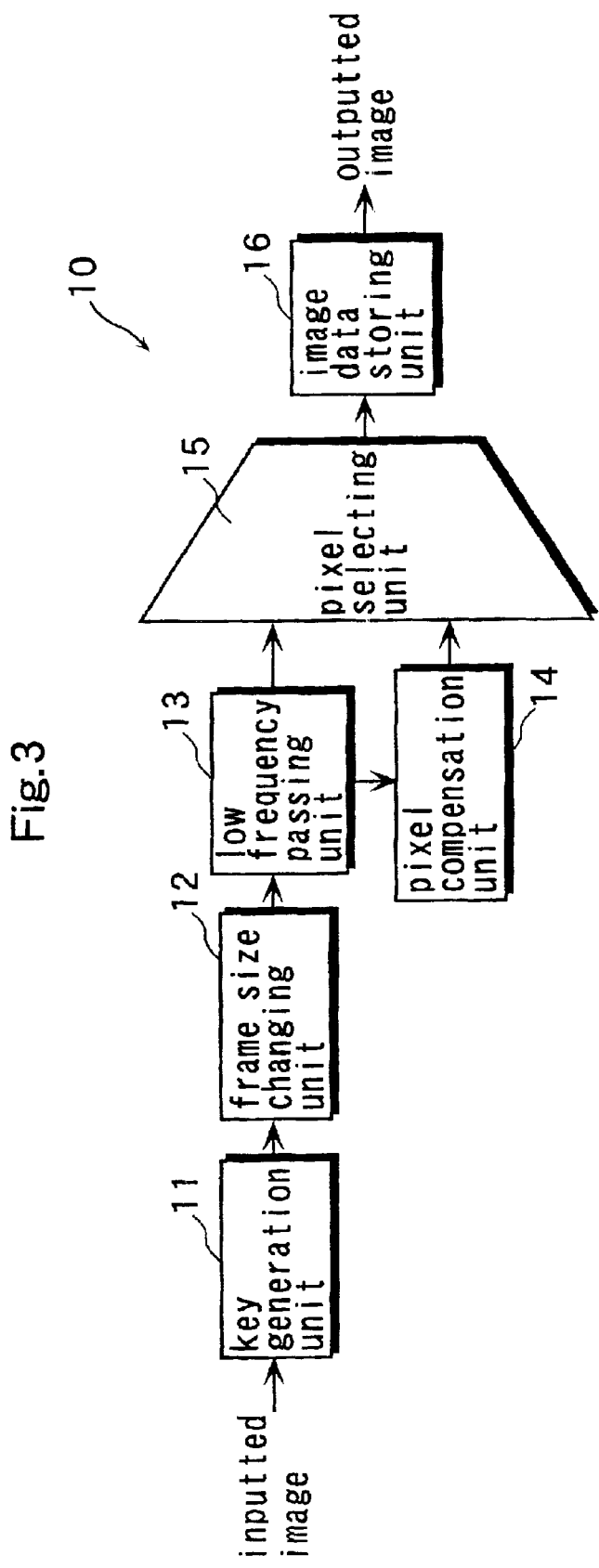

Fig. 17A
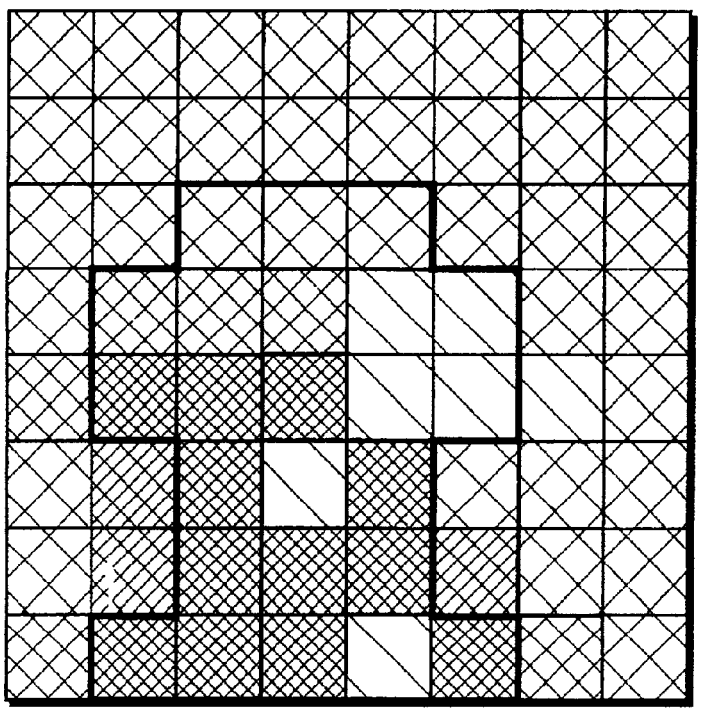
Fig. 17B
Fig. 17C
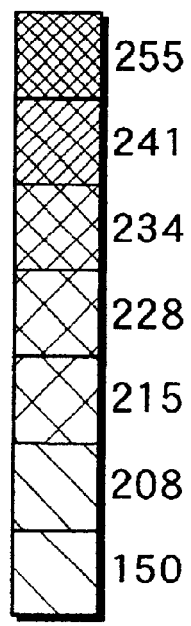

Fig.18

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 1 | 1 | 1 | 1 | 1 | 0 | 0 |
| 1 | 0 | 0 | 0 | 0 | 0 | 1 | 0 |
| 0 | 2 | 0 | 0 | 0 | 2 | 0 | 0 |
| 0 | 2 | 0 | 0 | 0 | 2 | 0 | 0 |
| 1 | 0 | 0 | 0 | 0 | 0 | 1 | 0 |

IMAGE OBJECT CONTENT GENERATION DEVICE AND PADDING DEVICE

BACKGROUND OF THE INVENTION (1) Field of the Invention

The present invention relates to an image object content generation device, and more specifically relates to a padding processing for padding outside of an image object.

(2) Description of the Prior Art

MPEG (Moving Picture Coding Experts Group)-4 has attracted attention as an image compression method suitable for a mobile terminal or Internet that has dramatically developed in these years, as well as being suitable for conventionally storing media or digital broadcasting. MPEG-4 is an object-based image coding method, and one of the important features thereof is to resolve an image signal into that of a background and that of a component part (an object), such as a figure and a building, so as to compress and extend the image data per object. As an application of this method, there are needs of enlarging and reducing a screen size, that is, the needs for displaying an image taken by a home video camera in a small-sized liquid crystal display panel, such as a mobile phone, for example. There are also needs of changing a size of image content data, such as a figure image, into an arbitrary size, that is, the needs for importing a figure image separately taken on a blue background into a pre-taken background so as to composite both.

FIG. 1A is a diagram showing one block of N×N pixels (N is a positive integer number) including a boundary between an object and a background when an image including an object and a background is scanned in the direction of an arrow. FIG. 1B is a graph showing a change of a pixel value (a brightness value, for example) of an image signal when the image in the block as shown in FIG. 1A is scanned in the direction x. In these figures, a horizontal axis indicates a location in the direction x, and a vertical axis indicates a pixel value at that location. And pixel values of an object pixel and a background pixel are indicated as digital values showing a gray scale in the range of $0 \leq Y \leq 255$. An enlarged boundary portion of an image actually taken by using a CCD (Charge Coupled Device) or the like is the image as shown in the right part of FIG. 1A, where an image signal of a background is mixed into an object portion or that of an object is mixed into a background portion. As a result, if a static image comprising an object and a background as shown in FIG. 1A is scanned in the direction of the arrow, the image signal in the object ($0 \leq x < x0$) is almost constant. On the contrary, the frequencies of the image signal become high around the boundary x0 between an object and a background, and they gradually turn to be constant the further they are from the boundary portion, as shown in FIG. 1B.

If an image block cut out from a frame includes an object pixel and a background pixel as the block shown in the right part of FIG. 1A does, when image data is compressed per object as a unit in MPEG-4, the image signal of the block includes high frequency components as shown in FIG. 1B and is not suitable for shape-adaptive discrete cosine transform (SA-DCT). Therefore, a padding processing needs to be performed in MPEG-4 for removing high frequency components of the image signal before performing the shape-adaptive discrete cosine transform. Padding processing is a processing for removing high frequency components by supplying an alternate pixel value to a background pixel adjacent to an object pixel (i.e., by padding a background pixel with an alternate pixel value).

As a prior art padding processing device, Japanese Laid-Open Patent Application H10-210470 Gazette discloses an example thereof, and this processing will be explained as follows based on FIG. 2.

FIG. 2 is a block diagram showing a structure of a conventional padding processing device disclosed in Japanese Laid-Open Patent Application H10-210470 Gazette. The padding processing device comprises a boundary block detection unit 100, a block scanning unit 210, a block compensation unit 220 and SA-DCT unit 300. The boundary block detection unit 100 scans plural image blocks of the same size of N×N pixels (N is a positive integer number) including an object pixel and a background pixel and detects a background pixel intervening between object pixels on the identical line or row in the image block (a padding pixel). The block scanning unit 210 calculates an alternate pixel value by using a pixel value of an object pixel. The block compensation unit 220 supplies the alternate pixel value to the padding pixel and generates a padded image block. Thereby, in the compensated object area, the padding pixel that is a background pixel intervening between object pixels is padded with the alternate pixel value, and as a result, high frequency components in the boundary portion are removed. In this way, by performing a padding processing in the block compensation unit 220, the SA-DCT unit 300 can perform appropriate shape-adaptive discrete cosine transform of the input image signal of the object area and the background area including an object pixel and a background pixel, respectively.

However, since the conventional padding processing device just replaces a pixel value of a padding pixel with an alternate pixel value, there is a high possibility that quality of a generated image is deteriorated. Therefore, if a size of content image cut out from an input image is changed into a certain size, for example, it is difficult to generate it as high grade pixel data. Also, there are problems such that a larger memory capacity is required, a larger circuit scale is required, more electric power is consumed, and processing speed is reduced for realizing the padding processing without deteriorating the grade of the cutout object image.

SUMMARY OF THE INVENTION

It is accordingly a first object of the present invention, in the light of the above-mentioned conventional problems, to provide a padding device that can perform a padding processing without deteriorating a grade of an object image, and an image object content generation device that can generate high quality image object content by such a padding processing.

Also, the second object of the present invention is to provide a padding device and an image object content generation device that can be realized in a small circuit scale and perform high speed processing.

The above-mentioned first object may be achieved by an image object content generation device of the present invention that comprises: a key generation unit operable to generate a key that is a reference to distinguish an object pixel from a background pixel per pixel of an inputted image signal; a frame size changing unit operable to change a frame size of the image signal; a low frequency component passing unit operable to remove high frequency components of the image signal which was processed in the frame size changing unit; a pixel compensation unit operable to perform a padding processing, according to Low Pass Extrapolation padding algorithm, to the image signal which was processed in the low frequency component passing unit based on the key generated by the key generation unit; and a pixel selecting unit operable to select one of the image signal which was processed in the low frequency component passing unit and the image signal which was processed in the pixel compensation unit.

As described above, in the image object content generation device, the key generation unit generates a key that is a reference to distinguish an object pixel from a background pixel per pixel of an inputted image signal. The frame size changing unit changes a frame size of the image signal. The low frequency component passing unit removes high frequency components of the image signal which was processed in the frame size changing unit. The pixel compensation unit performs a padding processing to the image signal which was processed in the low frequency component passing unit by using Low Pass Extrapolation padding algorithm. The pixel selecting unit selects one of the image signal which was processed in the low frequency component passing unit and the image signal which was processed in the pixel compensation unit.

That is, according to this image object content generation device, the pixel compensation unit performs a padding processing using Low Pass Extrapolation padding algorithm. Therefore, since not only an alternate pixel value is given to a padding pixel, but the filtering processing is performed after that, more careful padding processing in which a pixel value of an adjacent pixel is reflected is performed. As a result, the image object content generation device can generate a high quality image object content.

Also, the above-mentioned second object may be achieved by an image object content generation device of the present invention, wherein the pixel compensation unit further includes: a buffer memory that stores a value of an image signal and a key value of each pixel which is sequentially inputted; an alternate pixel value generation unit that generates an alternate pixel value of the image signal of the object pixel based on the key value of each pixel which is sequentially inputted; a padding pixel location storing unit that stores information indicating a location of a padding pixel based on the key value of each pixel which is sequentially inputted; and a filtering unit that specifies a padding pixel by referring to the padding pixel location storing unit, and performs a filtering processing to the specified padding pixel by using the alternate pixel value and the value of the image signal in the buffer memory.

Thereby, information indicating a location of a padding pixel is stored in the padding pixel location storing unit, and according to the information, the filtering processing is performed by using an alternate pixel value. Therefore, a useless step just for replacing a pixel value of a padding pixel with an alternate pixel value is bypassed, and the padding processing in which replacement and filtering processing are integrated is executed. As a result, an intermediate buffer memory for storing a condition in which a pixel value of a padding pixel is just replaced with an alternate pixel value is not necessary, and a processing of repeating reading-out the alternate pixel value from the buffer memory is not necessary as well, thereby a circuit scale is reduced and processing speed is improved.

Note that the present invention can be embodied as an all-purpose padding device comprising only the function of the pixel compensation unit that is a distinctive constituent element of the image object content generation device (that is a padding device that performs a padding processing for padding outside of an image object). In addition, the present invention can be embodied as an image object content generation method and a padding method of which processing steps are distinctive constituent elements of the image object content generation device and the padding device, or as a program for making a computer execute the steps. And it goes without saying that the program can be distributed via a memory medium readable by a computer, such as a CD-ROM, and a transmission medium, such as a communication path.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 3 is a block diagram showing a structure of the image object content generation device of the present invention.

FIG. 17A is a diagram showing brightness values after the alternate pixel supplying unit performs a two-dimensional filtering processing to the image block as shown in FIG. 15A by using the padding map as shown in FIG. 16B.

FIG. 17B is a diagram showing the brightness values visually after the alternate pixel supplying unit performs the two-dimensional filtering processing.

FIG. 17C is a diagram showing a relation between brightness values of respective pixels in the image block as shown in FIG. 17A and hatchings as shown in FIG. 17B.

FIG. 18 is a diagram showing a number of times that the buffer memory is referred to per pixel of the image block in the two-dimensional filtering of the alternate pixel supplying unit.

DESCRIPTION OF THE PREFERRED EMBODIMENTS

Figure 1A:
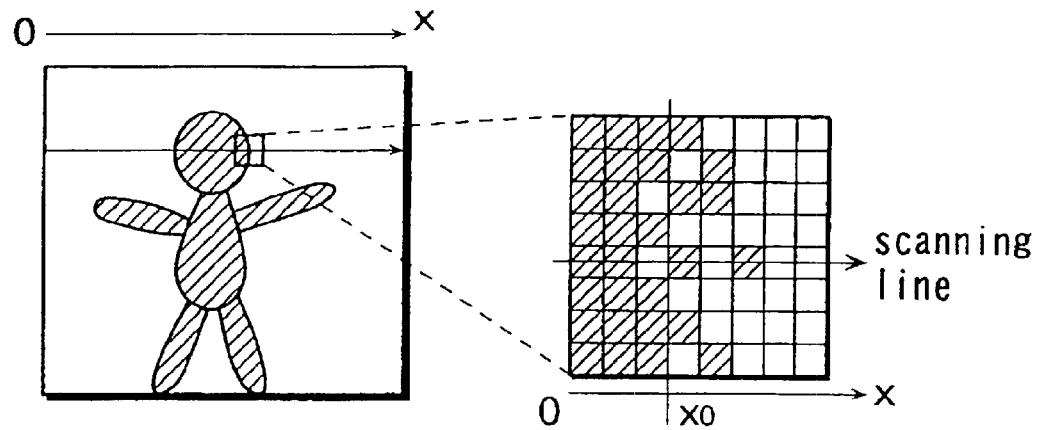
FIG. 1A is a diagram showing one of blocks of N×N pixels (N is a positive integer number) including a boundary between an object and a background when an image including an object and a background is scanned in the direction of an arrow.
Figure 1B:
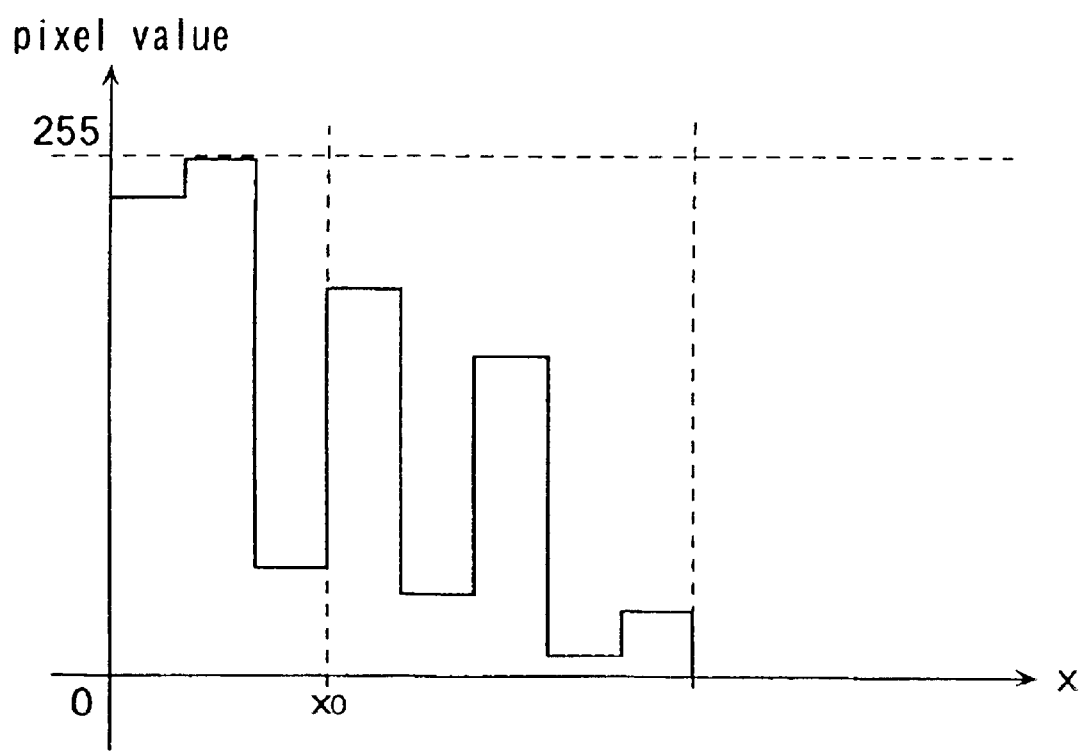
FIG. 1B is a graph showing a change of a pixel value (a brightness value, for example) of an image signal when the image in the block as shown in FIG. 1A is scanned in the direction x.
Figure 2:
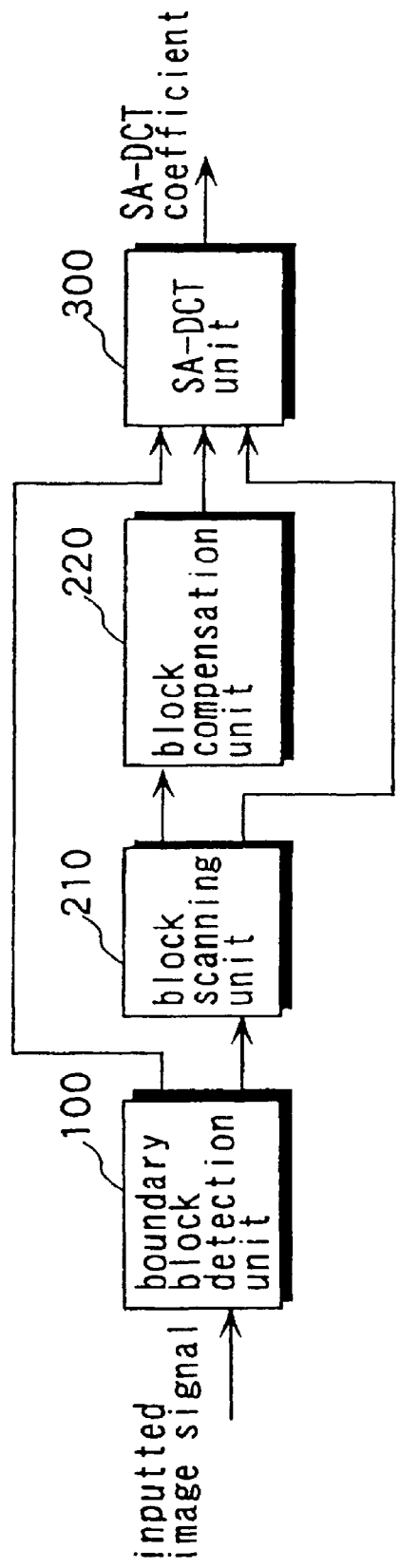
FIG. 2 is a block diagram showing a structure of a conventional padding processing device disclosed in Japanese Patent Laid-Open Application H10-210470 Gazette.

The following is an explanation of the embodiments of the present invention with reference to figures.

FIG. 3 is a block diagram showing a structure of an image object content generation device 10 of the present invention. The image object content generation device 10 changes a frame size of an image which is expressed by an inputted image signal, has a function of smoothing a boundary between an object image and a background image within the frame, and comprises a key generation unit 11, a frame size changing unit 12, a low frequency passing unit 13, a pixel compensation unit 14, a pixel selecting unit 15 and an image data storing unit 16.

The key generation unit 11 inputs an image signal indicating an image inputted to the image object content generation device 10, accepts an input of a parameter regarding key setting by a user, and generates a key signal based on the parameter. Here, the user inputs for setting a color if he/she uses a chroma key, for example. Also, a key is used for distinguishing an object pixel from a background pixel in the inputted image, and indicates how far an attribute of each pixel is from a color specified by a user. More specifically, the attribute of each pixel is comprised of a brightness value Y, and two color difference values Cb, Cr, and the key is expressed by the difference between a hue obtained from a color difference of each pixel and that of the color specified by the user.

The frame size changing unit 12 transforms a frame size of an image by enlarging or reducing the image expressed by the image signal inputted to the image object content generation device 10. It accepts an input of a scale factor for changing the frame size from a user and gives a new pixel value and a key value to a newly generated pixel in the original frame by linear interpolation, so as to transform the frame size of the inputted image by the inputted scale factor.

The low frequency passing unit 13 removes high frequency components of an inputted image signal. If the frame size is enlarged in the frame size changing unit 12 in the previous step, the low frequency passing unit 13 outputs the inputted image signal as it is, and if the frame size is reduced, it removes high frequency components that arise due to pixel skipping, etc.

The pixel compensation unit 14, which is a processing unit that is realized by software, such as a program, hardware, such as a logic circuit, or a combination of them, gives an alternate pixel value to a background pixel in each image block including object pixels and background pixels according to Low Pass Extrapolation padding algorithm, so as to pad the image block.

The pixel selecting unit 15 switches, per frame, between the output of the low frequency passing unit 13 and the output of the pixel compensation unit 14, which are inputted to the pixel selecting unit 15, for example. That is, based on a user's instruction, it selects the output of the low frequency passing unit 13 when an image of a background area is required and selects the output of the pixel compensation unit 14 when an image of an object area is required, so as to output either of them.

The image data storing unit 16 stores image data from the pixel selecting unit 15 in a buffer memory, and outputs the image data according to an output request from outside. If a FIFO is used for the buffer memory, communication between this buffer memory and an outside interface becomes easier.

Figure 4A:
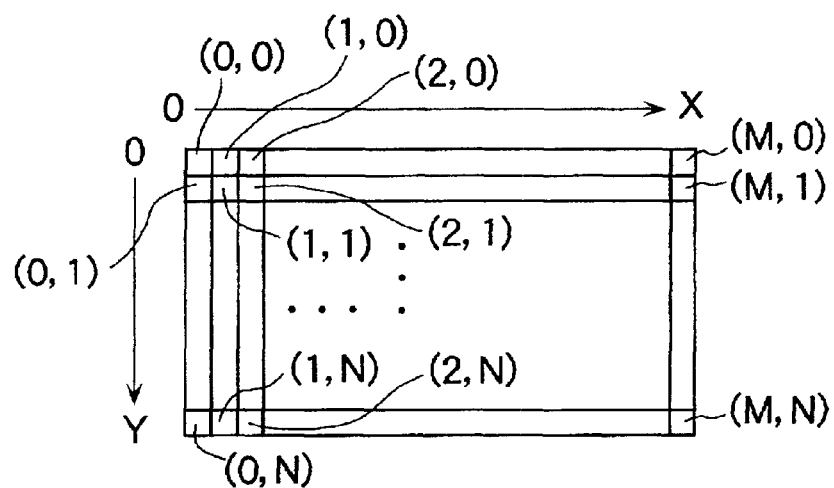
FIG. 4A is a diagram showing contents of an image signal that is processed by the image object content generation device as shown in FIG. 3.
Figure 4B:
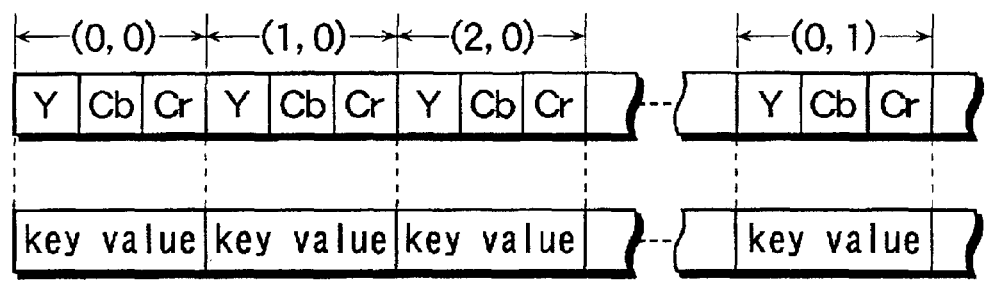
FIG. 4B is a diagram showing an example of a structure of an image signal and a key signal that are used in the image object content generation device 10 as shown in FIG. 3.
Figure 4C:
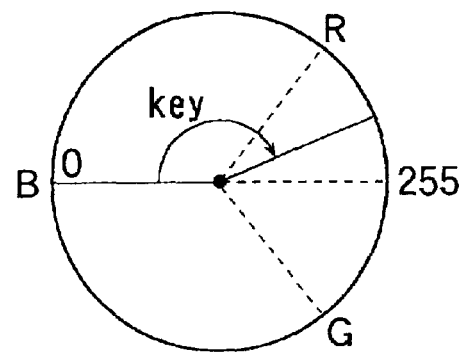
FIG. 4C is a diagram showing a key in the case that hue is expressed by a circumference and chroma is expressed by a radius.

FIG. 4A is a diagram showing contents of an image signal that is processed by the image object content generation device 10 as shown in FIG. 3. FIG. 4B is a diagram showing an example of a structure of an image signal and a key signal that are used in the image object content generation device 10 as shown in FIG. 3. FIG. 4C is a diagram showing a key in the case that hue is expressed by a circumference and chroma is expressed by a radius.

As shown in FIG. 4A, each pixel of one static image (a frame) is scanned from the left to the right on the top horizontal scanning line of the frame, and then scanned from the left to the right on the following horizontal scanning line, and so forth. The image signals of one frame indicating the inputted image to the image object content generation device 10 are image signals in which an image signal indicating an attribute of each pixel on the scanning line is serially arranged in the above-mentioned scanning order. A pixel is a rectangular minimum unit when a frame is divided horizontally and vertically, and each pixel has one attribute that is uniquely expressed by a brightness signal Y, a color difference signal of blue Cb and a color difference signal of red Cr.

More specifically, if a horizontal scanning direction is the X axis, a vertical scanning direction is the Y axis, and the coordinate value of the upper left corner of one frame is (0, 0), as shown in FIG. 4A, each pixel is expressed by a coordinate value (x, y). Further, if one frame is divided into M pixels (M is a positive integer number of 2 or more) in the horizontal scanning direction and into N pixels (N is a positive integer number of 2 or more) in the vertical scanning direction, each pixel is first scanned on the top horizontal scanning line in the order of the coordinates (0, 0), (1, 0), (2, 0), . . . (M, 0), and then the coordinates (0, 1), (1, 1), (2, 1), . . . (M, 1). The pixels on the following horizontal scanning lines are sequentially scanned in the same way, and finally, after the pixels on the bottom horizontal scanning line are scanned in the order of the coordinates (0, N), (1, N), (2, N), . . . (M, N), the scanning is finished.

In this way, the image signals indicating one frame are structured in such a way that an image signal indicating (Y, Cb, Cr) of a pixel on each of the coordinates is serially arranged in the above scanning order, as shown in the upper part of FIG. 4B. A value of an image signal indicating an attribute of each pixel is referred as a pixel value hereinafter.

Further, as shown in the lower part of FIG. 4B, in the image object content generation device 10, a key indicating how far the hue of each pixel is from that specified by a user is calculated per pixel based on the above pixel value, stored corresponding to the above pixel value, and used in each processing. A key in a chroma key with a blue background is, for example, a hue difference from blue, and expressed by an integer number from 0 through 255.

When hue is expressed by a circumference and chroma is expressed by a radius as shown in FIG. 4C, a key value is given by 255×θ/π (fractions are rounded down) regardless of bias in the radius (chroma) direction if an angle between the radius that passes the point indicating blue specified by a parameter and the radius that passes the point indicating a hue of a pixel is θ (0≦θ≦π).

Although a chroma key is used here, another key or another method can be used, and there is no need to limit a background color to be blue. Also, although a pixel value of each pixel is expressed by (Y, Cb, Cr), it can be expressed in another way. Further, a key value can also be calculated in another method.

Figure 5:
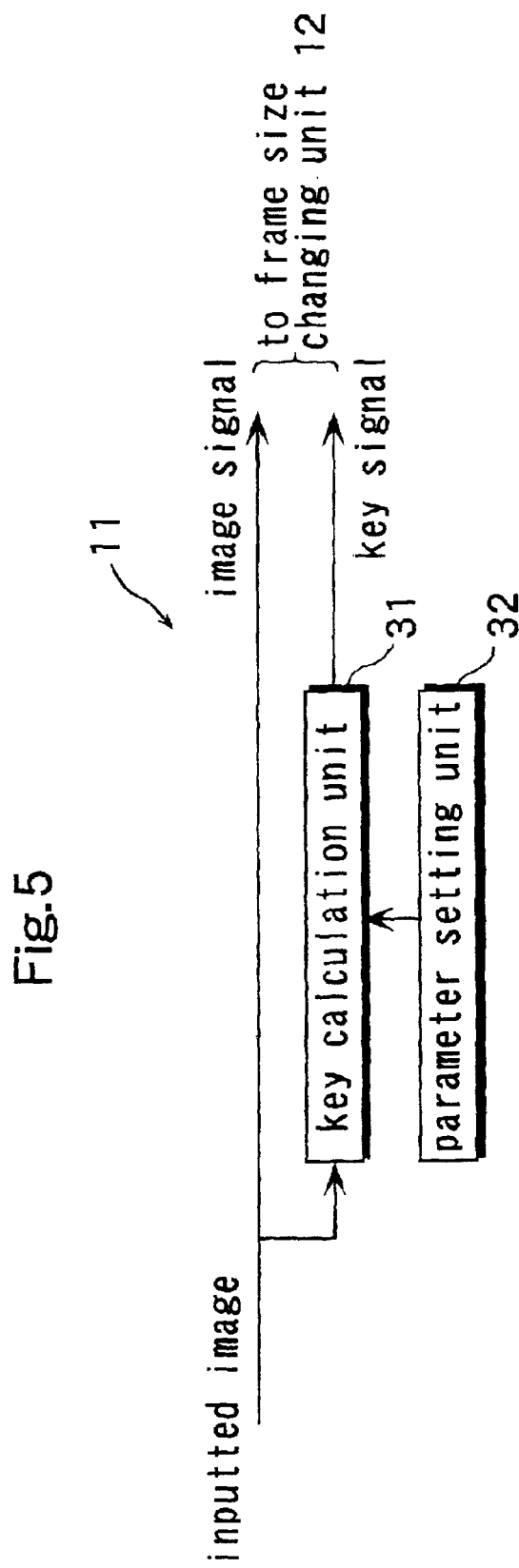
FIG. 5 is a block diagram showing an example of an internal structure of the key generation unit as shown in FIG. 3.

FIG. 5 is a block diagram showing an example of an internal structure of the key generation unit 11 as shown in FIG. 3. The key generation unit 11 comprises a key calculation unit 31 and a parameter setting unit 32.

The key calculation unit 31 generates a key signal indicating an object pixel and a background pixel included in an inputted image signal by using a specified condition (such as a color) among the inputted image signal. The condition on which the key signal is generated is determined by the value set by the parameter setting unit 32, and this value can be changed depending upon an image. The image signal and the key signal generated by the key calculation unit 31 are inputted to the frame size changing unit 12.

The parameter setting unit 32 accepts an input of a condition by a user from an operation unit, such as a keyboard, not shown here, and sets the inputted condition as a parameter of the key. Here, the above condition is a hue value of a background pixel.

Figure 6:
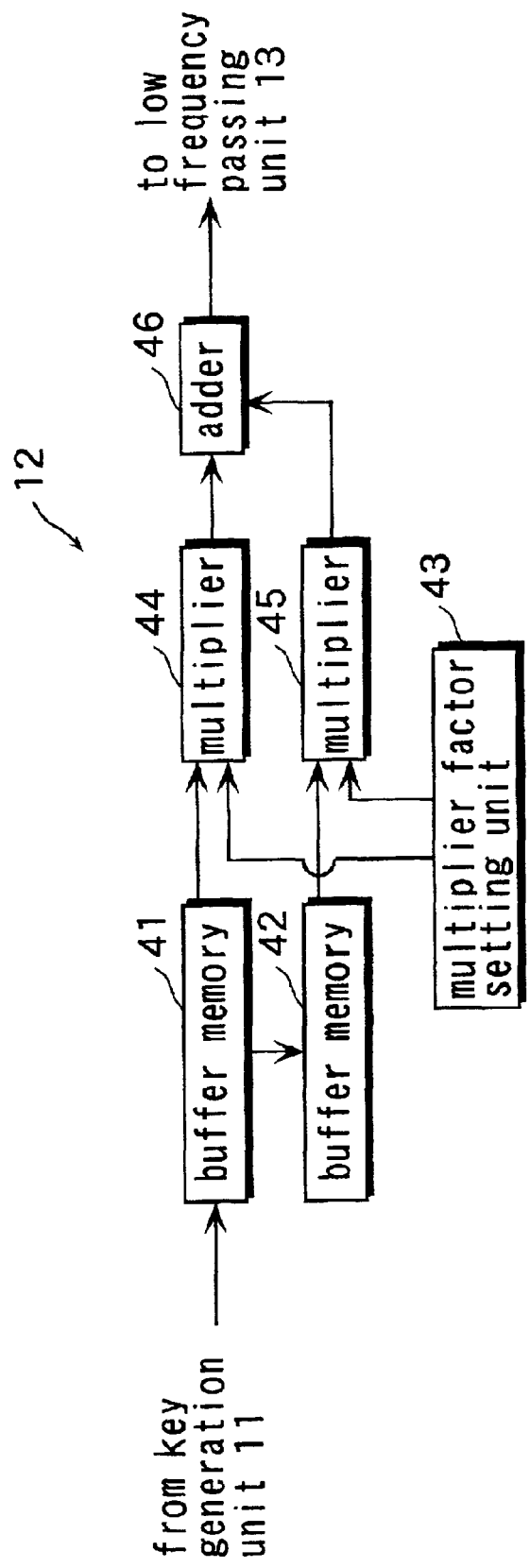
FIG. 6 is a block diagram showing an example of an internal structure of the frame size changing unit as shown in FIG. 3.

FIG. 6 is a block diagram showing an example of an internal structure of the frame size changing unit 12 as shown in FIG. 3. The frame size changing unit 12 comprises a buffer memory 41, a buffer memory 42, a multiplier factor setting unit 43, a multiplier 44, a multiplier 45 and an adder 46.

The buffer memory 41 and the buffer memory 42 store one line of pixel data (a pixel value and a key value) on the same line. The multiplier factor setting unit 43 sets multiplier factors for the multiplier 44 and the multiplier 45. The multiplier 44 multiplies the output of the buffer memory 41 by the multiplier factor set by the multiplier factor setting unit 43. The multiplier 45 multiplies the output of the buffer memory 42 by the multiplier factor set by the multiplier factor setting unit 43. The adder 46 adds the outputs of the multiplier 44 and the multiplier 45. The frame size changing unit 12 as structured as above performs an interpolation processing and a skipping processing by using two pixel data on the same line so as to generate new pixel data, because a pixel value and a key value need to be generated for a new pixel when the frame size is enlarged or reduced. The interpolation processing and skipping processing will be explained as follows.

The multiplier factor setting unit 43 sets multiplier factors for the multiplier 44 and the multiplier 45, and these multiplier factors are values determined depending upon an enlargement and reduction ratio of a frame size. If the value is Q/P (P and Q are positive integer numbers), for example, the multiplier factor setting unit 43 performs a processing per consecutive P pixels and outputs image signals of Q pixels. If Q is more than 2, it finds j in which j/(P−1)<i/(Q−1)<(j+1)/(P−1) is established (i and j are positive integer numbers) as a multiplier factor for the ith data of the pixel data to be outputted of Q pixels, and calculates a multiplier factor for the multiplier 44 by 1−(P−1)×((i/(Q−1))−(j/(P−1))) and a multiplier factor for the multiplier 45 by (P−1)× ((i/(Q−1))−(j/(P−1))). A skipping processing is performed when Q is 1 or 2, and 1 is set for the multiplier 44 as a multiplier factor for the first time only when Q is 1, and 0 is set for any other time. When Q is 2, 1 is set for the multiplier 44 for the first time, and 1 is set for the multiplier 45 at the last time, and 0 is set for any other time.

The multiplier 44 and the multiplier 45 multiply the multiplier factor set by the multiplier factor setting unit 43 in this way and the data stored in the buffer memory 41 and the buffer memory 42, and output the result to the adder 46. The adder 46 adds up the multiplication results of the multiplier 44 and the multiplier 45 to output them. In this way, the frame size changing unit 12 linearly interpolates data of a new pixel that is generated by skipping or interpolation processing by using data of adjacent pixels. As a result, the data of pixel (the pixel value and key value) of which frame size is changed becomes the inputted data to the low frequency passing unit 13.

Figure 7:
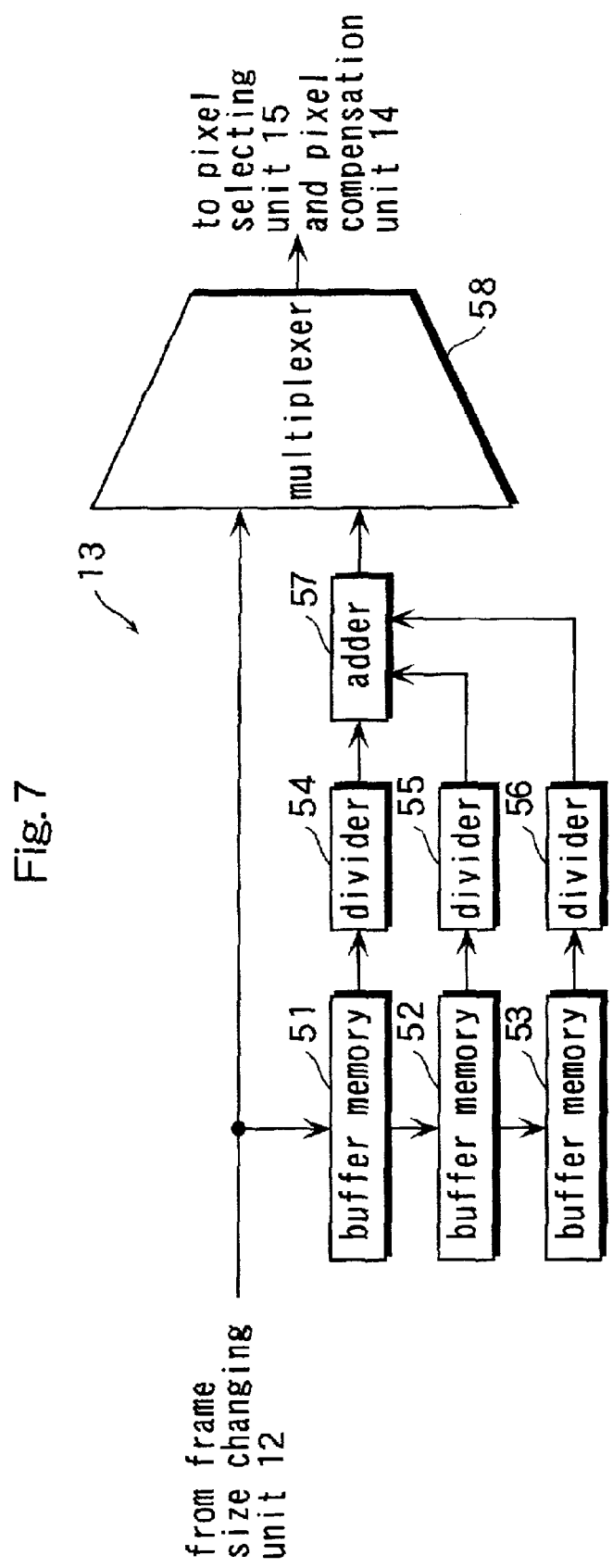
FIG. 7 is a block diagram showing an example of an internal structure of the low frequency passing unit as shown in FIG. 3.

FIG. 7 is a block diagram showing an example of an internal structure of the low frequency passing unit 13 as shown in FIG. 3. The low frequency passing unit 13 comprises buffer memories 51~53, dividers 54~56, an adder 57 and a multiplexer 58.

A filtering processing to inputted data from the frame size changing unit 12, more specifically the filtering processing to 3 consecutive pixels when the ratio of weighing factors is 1:2:1, for example, will be explained as follows. The buffer memories 51~53 store data of adjacent pixels on the same line. The dividers 54~56 divide numbers to be divided that are the data stored by the buffer memories 51~53 by division factors 4, 2, and 4, respectively. The adder 57 adds up the division results of the dividers 54~56. The ratio of weighing factors in the filtering processing can be set arbitrarily, and division factors can also be determined arbitrarily. Also, the number of consecutive pixels for the filtering processing can be set arbitrarily only if the ratio is set corresponding to the number of pixels.

The multiplexer 58 selects either the inputted data to the low frequency passing unit 13 or the filtering-processed data. Since high frequency components must be removed when the frame size is reduced, it selects the filtering-processed signal. The data selected in the multiplexer 58 is supplied to the pixel compensation unit 14 and the pixel selecting unit 15.

Figure 8:
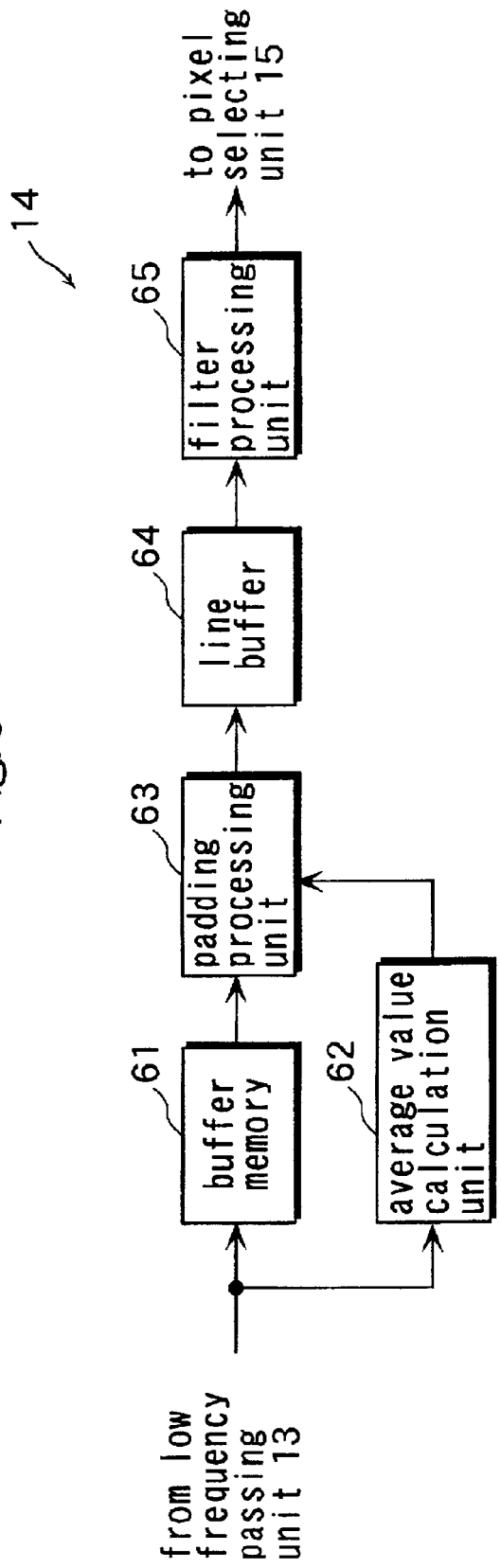
FIG. 8 is a block diagram showing an example of an Internal structure of the pixel compensation unit as shown in FIG. 3.

FIG. 8 is a block diagram showing an example of an internal structure of the pixel compensation unit 14 as shown in FIG. 3. The pixel compensation unit 14 performs a padding processing for compensating for a background pixel (a padding pixel) adjacent to an object pixel with an alternate pixel value. Here, Low Pass Extrapolation padding algorithm that is precise in a padding processing is applied.

The Low Pass Extrapolation padding algorithm is executed at the following 3 stages. At the first stage, as to pixels having key values of a predetermined threshold value and larger, that is, object pixels, the average value of the values of the pixels (brightness values Y, color difference values Cr and Cb) is found per N×N pixel block (N is a positive integer number). At the second stage, as to pixels having key values below the predetermined threshold value, that is, background pixels, the pixel values of the pixels are replaced with the average value found at the first stage. At the third stage, as to pixels having key values below the predetermined threshold value, that is, background pixels, a two-dimensional filtering processing is performed to take the average value of the pixel values of the upper, lower, right and left 4 pixels and replace the pixel value of the pixel with the average value.

The pixel compensation unit 14 comprises a buffer memory 61, an average value calculation unit 62, a padding processing unit 63, a line buffer 64 and a filter processing unit 65. The buffer memory 61 is a memory having a memory area for storing pixel values and key values for an image block of N×N pixels (N is a positive integer number). As the first stage of the above-mentioned Low Pass Extrapolation padding algorithm, the average value calculation unit 62 refers to data of a pixel which is sequentially written in the buffer memory 61 per pixel, compares a key of the data with a threshold value separately inputted by a user, adds up the pixel values of the pixels having keys of the threshold value or larger, and counts the number of the pixels. The average value of brightness values is found at the time when the data of the pixels for one image block, that is, the pixels for N lines, are stored in the buffer memory 61, and then the processing goes to the next step.

As the second stage, the padding processing unit 63 reads out the data stored in the buffer memory 61, detects the pixel having the key below the threshold value, replaces the pixel value of the pixel with the average value found by the average value calculation unit 62, and then outputs it to the line buffer 64. The line buffer 64 is a memory having a memory area for storing pixel values and key values for 3 lines.

As the third stage, the filter processing unit 65 sequentially reads out the pixel value and the key value of each pixel stored in the line buffer 64, reads out the pixel values of upper, lower, right and left 4 pixels adjacent to the pixel from the line buffer 64 if the key value thereof is below the threshold value, and takes the average of the values of 4 pixels adjacent to the pixel. Further, it replaces the pixel value of the pixel with the average value, and then outputs the image signal of the pixel to the pixel selecting unit 15.

During the above-mentioned processing, the pixel compensation unit 14 can be realized by a three-stage pipeline processing. Also, in the above-mentioned structure, a circuit for calculating an average value of (brightness) values of pixels having key values of a threshold value or larger is required in order to realize the first stage processing. Since the processing of the second and the following stages can be performed only after the average value is found, a buffer memory for storing data of pixels for N lines is required. Since the upper and lower pixels are referred in the third stage processing, a buffer memory for at least 2 lines and 1 pixel is required. Therefore, the Low Pass Extrapolation padding processing requires a processing unit for executing 3 processes and a buffer memory for storing data of pixels for (N+2) lines.

Figure 9:
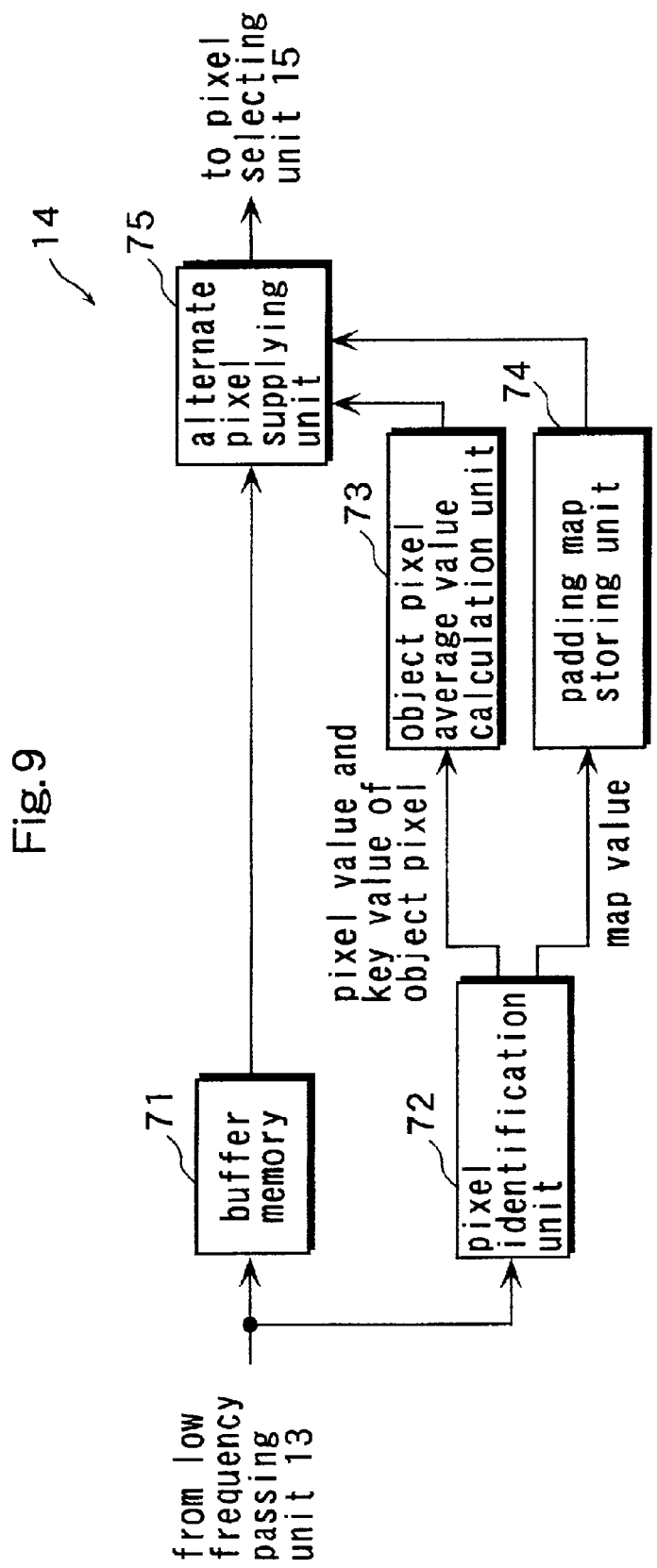
FIG. 9 is a block diagram showing another example of an internal structure of the pixel compensation unit as shown in FIG. 3.

FIG. 9 is a block diagram showing another example of an internal structure of the pixel compensation unit 14 as shown in FIG. 3. The pixel compensation unit 14 as shown in FIG. 9 comprises a buffer memory 71, a pixel identification unit 72, an object pixel average value calculation unit 73, a padding map storing unit 74 and an alternate pixel supplying unit 75. In this pixel compensation unit 14, the Low Pass Extrapolation padding algorithm is performed at the following two stages.

The buffer memory 71 has a memory area for storing data of pixels (pixel values and key values) in an image block of N×N pixels (N is a positive integer number), and sequentially stores per pixel the data of the pixels inputted from the low frequency passing unit 13 in the buffer memory.

At the first stage of the Low Pass Extrapolation padding algorithm, the pixel identification unit 72 compares a key value of each pixel inputted from the low frequency passing unit 13 at the previous step with the above-mentioned threshold value, and then identifies whether the pixel is a padding pixel or an object pixel. If the key value is the threshold value or larger, the pixel identification unit 72 outputs "0" indicating that the pixel is an object pixel to the padding map storing unit 74, and outputs the data of the pixel to the object pixel average value calculation unit 73. If the key value is less than the threshold value, it outputs "1" indicating that the pixel is a padding pixel to the padding map storing unit 74.

At the first stage of the Low Pass Extrapolation padding algorithm, the object pixel average value calculation unit 73 calculates the average value of the pixel values of the object pixels identified by the pixel identification unit 72. More specifically, it adds up the pixel value of the object pixel identified by the pixel identification unit 72 sequentially on every input, counts the number of the pixels, and divides the total of the pixel values of the object pixels by the counted number of the pixels at the time when the data for N lines are stored in the buffer memory 71, so as to find the average value of the pixel values of the object pixels.

The padding map storing unit 74 is a memory having a memory area for storing a map indicating whether a pixel is a padding pixel or an object pixel by 1 bit of either "1" or "0" per pixel within an image block of N×N pixels, in which a map is written per pixel by the pixel identification unit 72.

While the image data for N lines is stored in the buffer memory 71 as mentioned above, the average value of the pixel values is calculated in the object pixel average value calculation unit 73, a padding map is completed in the padding map storing unit 74, and the pixel compensation unit 14 starts the processing of the next stage of the Low Pass Extrapolation padding algorithm. Although the padding map storing unit 74 stores the padding map indicating whether the pixel is a padding pixel or an object pixel by 1 bit of either "1" or "0" here, the present invention is not limited to this embodiment, and a location on an image block of a padding pixel identified by the pixel identification unit 72 may be stored in a memory, for example.

At the second stage of the Low Pass Extrapolation padding algorithm, the alternate pixel supplying unit 75 refers a map stored in the padding map storing unit 74 or a location of a padding pixel on an image block, and performs a two-dimensional filtering processing to the padding pixel. If the upper, lower, right and left adjacent 4 pixels required for the two dimensional filtering processing are padding pixels, the pixel values stored in the buffer memory 71 need not be referred to, and the average value calculated by the object pixel average value calculation unit 73 is used. It is identified whether or not the upper, lower, right and left adjacent 4 pixels are padding pixels respectively by referring to the map stored in the padding map storing unit 74.

Note that although the padding map storing unit 74 stores a padding map of N×N pixels in the above explanation, the present invention is not limited to this embodiment, and the padding map storing unit 74 may have a memory area for a map of (N+2)×(N+2) pixels for storing the above-mentioned padding map of N×N pixels in the portion of N×N pixels inside thereof, and the portion of peripheral pixels may be initialized as padding pixels. As a result, no exceptional processing is required for the peripheral portions adjacent to other image blocks, and thereby unnaturalness of an image in a boundary between image blocks can be removed after the two-dimensional filtering. Similarly, if the padding map storing unit 74 stores a location of a padding pixel on the image block, and not a padding map as described above, the padding map storing unit 74 may have a memory area for a map of (N+2)×(N+2) pixels beforehand, and the portion of the peripheral pixels in the above-mentioned image block may be initialized as padding pixels. As a result, no exceptional processing is required for the peripheral portions, and unnaturalness of the image in the boundary between the image blocks can be removed.

As mentioned above, according to the pixel compensation unit 14 as shown in FIG. 9, the number of image memories and memory areas for storing pixel values and key values of large data can be reduced more than the pixel compensation unit 14 as shown in FIG. 8. Therefore, there is an effect that a circuit scale of the pixel compensation unit 14 can be reduced. When an image object content generation device 10 of a circuit scale that is the same as the conventional one is structured by using the above pixel compensation unit 14, if a bit number of a pixel value is increased by increasing memory capacity of an image memory by the circuit scale reduced by the pixel compensation unit 14 as shown in FIG. 9, resolution of an image signal can be improved, thereby producing an effect that an image object content of higher quality is obtained.

Further, according to the pixel compensation unit 14 as shown in FIG. 9, the same result as the padding processing by the padding processing unit 63 as shown in FIG. 8 is obtained by making a padding map in the padding map storing unit 74. In addition, since the padding map is completed at the time when pixel values and key values of one image block are written in the buffer memory 71, the alternate pixel supplying unit 75 can start two-dimensional filtering immediately after that. On the other hand, in the pixel compensation unit 14 as shown in FIG. 8, the average value of pixel values of object pixels are just obtained at the time when pixel values and key values of one image block are written in the buffer memory 61, and after that, the filter processing unit 65 cannot start two-dimensional filtering processing until the padding processing unit 63 completes a padding processing to pixels at least of two lines. Therefore, there is an effect that the pixel compensation unit 14 as shown in FIG. 9 can complete a padding processing and a two-dimensional filtering processing more quickly than the pixel compensation unit 14 as shown in FIG. 8.

The operation of the pixel compensation unit 14 as structured above will be explained by using flow charts as shown in FIG. 10 through FIG. 14. Note that although a brightness value will be explained as an example of data of each pixel in the following a padding processing and a two-dimensional filtering are also performed to values of color differences Cr and Cb in practice according to the same procedure as that for the brightness value. Padding and two dimensional filtering to a value of each color difference Cr or Cb may be performed in parallel with the processing for the brightness value by using 3 counters for finding an average value. Or a sequential processing in the order of brightness value →a value of a color difference Cr→a value of a color difference Cb may be performed.

Figure 10:
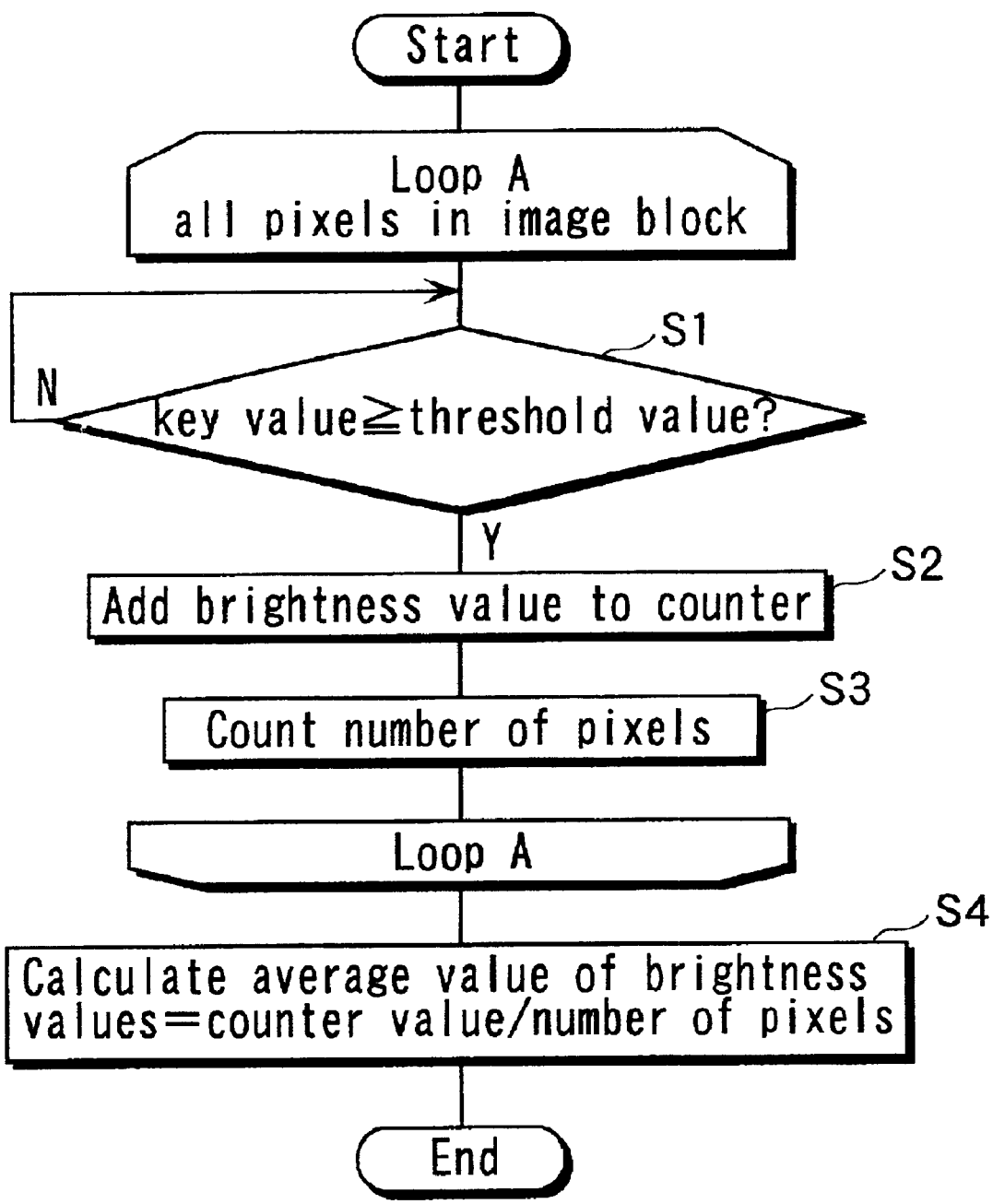
FIG. 10 is a flowchart showing an example of a processing procedure of the average value calculation unit as shown in FIG. 8.

FIG. 10 is a flowchart showing an example of a processing procedure of the average value calculation unit 62 as shown in FIG. 8. The average value calculation unit 62 repeats the following average value calculation processing (S1~S3) for data of each pixel in an image block of N×N pixels which is sequentially inputted (Loop A).

That is, the average value calculation unit 62 compares a key value of each pixel which is sequentially inputted with a threshold value relevant to a user's input (S1), adds a brightness value of a pixel having a key of the threshold value or larger, that is, an object pixel to a counter (S2), and counts the number of the pixels (S3). If a key value of a pixel is smaller than the threshold value (that is, a background pixel) as a result of comparison between the key value of the pixel and the threshold value relevant to the user's input (S1), the average value calculation unit 62 compares a key value of a pixel which is inputted next with the threshold value relevant to the user's input (S1).

After completing the processing of adding the brightness values of object pixels for all the pixels in the image block, the average value calculation unit 62 calculates the average value of the brightness values by using the value of the counter to which the brightness values were added as a dividend and the counted number of pixels as a divider, and outputs the calculation result to the padding processing unit 63 (S4).

After that, the average value calculation unit 62 clears the counter to which the brightness values were added, and then repeats the processing sequentially as shown in the above flowchart for a new image block of N×N pixels. When the average value of the brightness values of the object pixels in the image block is found by the average value calculation unit 62, the following processing by the padding processing unit 63 starts.

Figure 11:
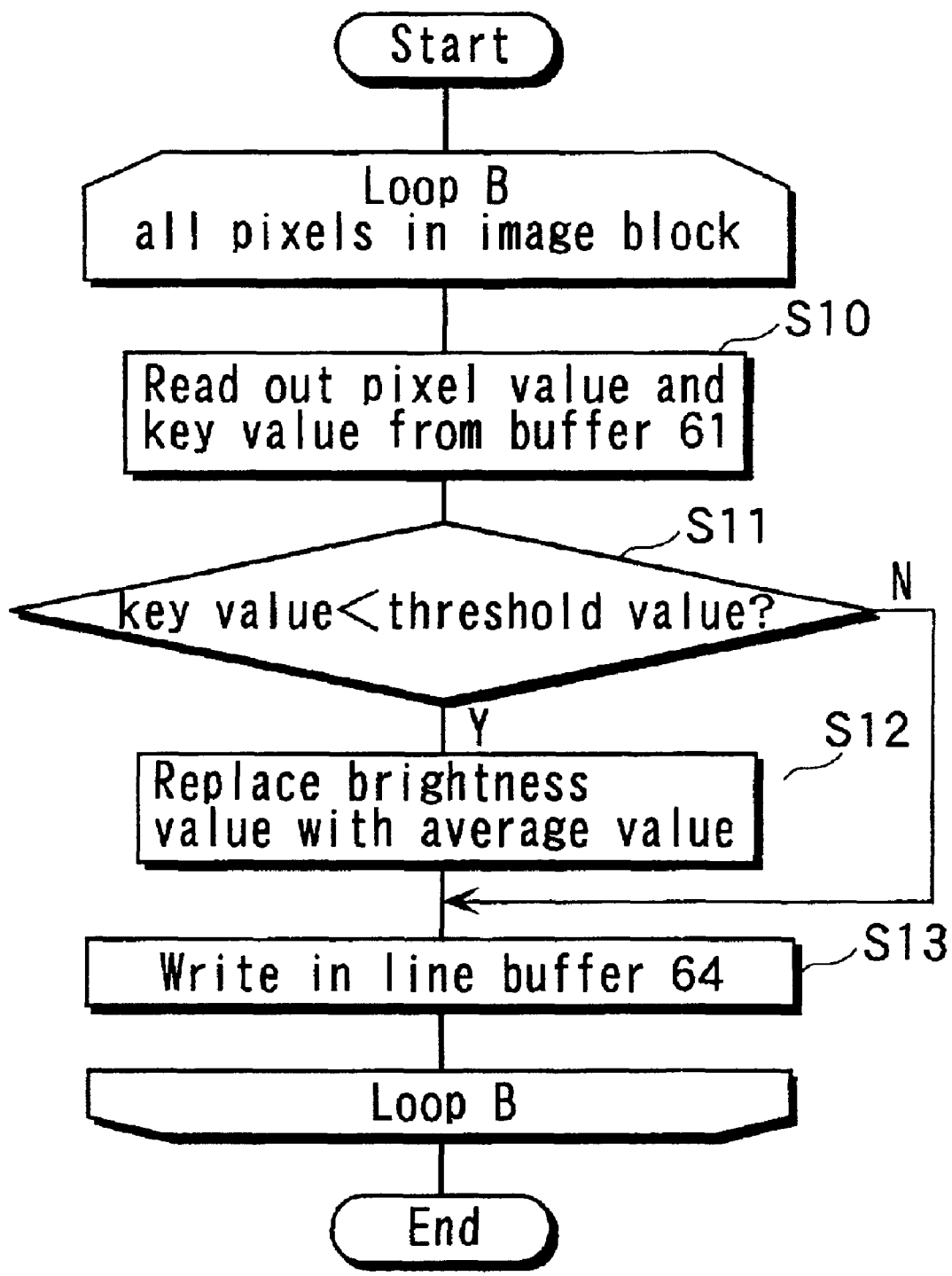
FIG. 11 is a flowchart showing a processing procedure of the padding processing unit as shown in FIG. 8.

FIG. 11 is a flowchart showing a processing procedure of the padding processing unit 63 as shown in FIG. 8. The padding processing unit 63 repeats the following padding processing (S10 S13) for all pixels in an image block of N×N pixels stored in the buffer memory 61 in the above-mentioned scanning order (Loop B).

That is, the padding processing unit 63 reads out a pixel value and a key value of one pixel stored in the buffer memory 61 (S10). Next, it compares the read-out key value of the pixel with the above threshold value relevant to the user's input (S11), and if the key value of the pixel is smaller than the threshold value (a background pixel), it replaces the brightness value of the pixel with the average value found by the average value calculation unit 62 (S12) and outputs the pixel value and key value of the pixel to the line buffer 64 (S13). The padding processing unit 63 compares the read-out key value of the pixel with the above threshold value relevant to the user's input (S11), and if the key value of the pixel is the threshold value or larger (an object pixel), it outputs the pixel value and key value read out from the buffer memory 61 to the line buffer 64 (S13).

Here, when the padding processing unit 63 completes the above padding processing to the pixels of 3 lines (that is, 3N pixels) of the image block, the filter processing unit 65 at the following stage starts the next processing. Further, when the padding processing unit 63 completes the above padding processing to all the pixels in the image block of N×N pixels stored in the buffer memory 61, it repeats the processing as shown in the above flowchart to pixels in a new image block stored in the buffer memory 61.

Figure 12:
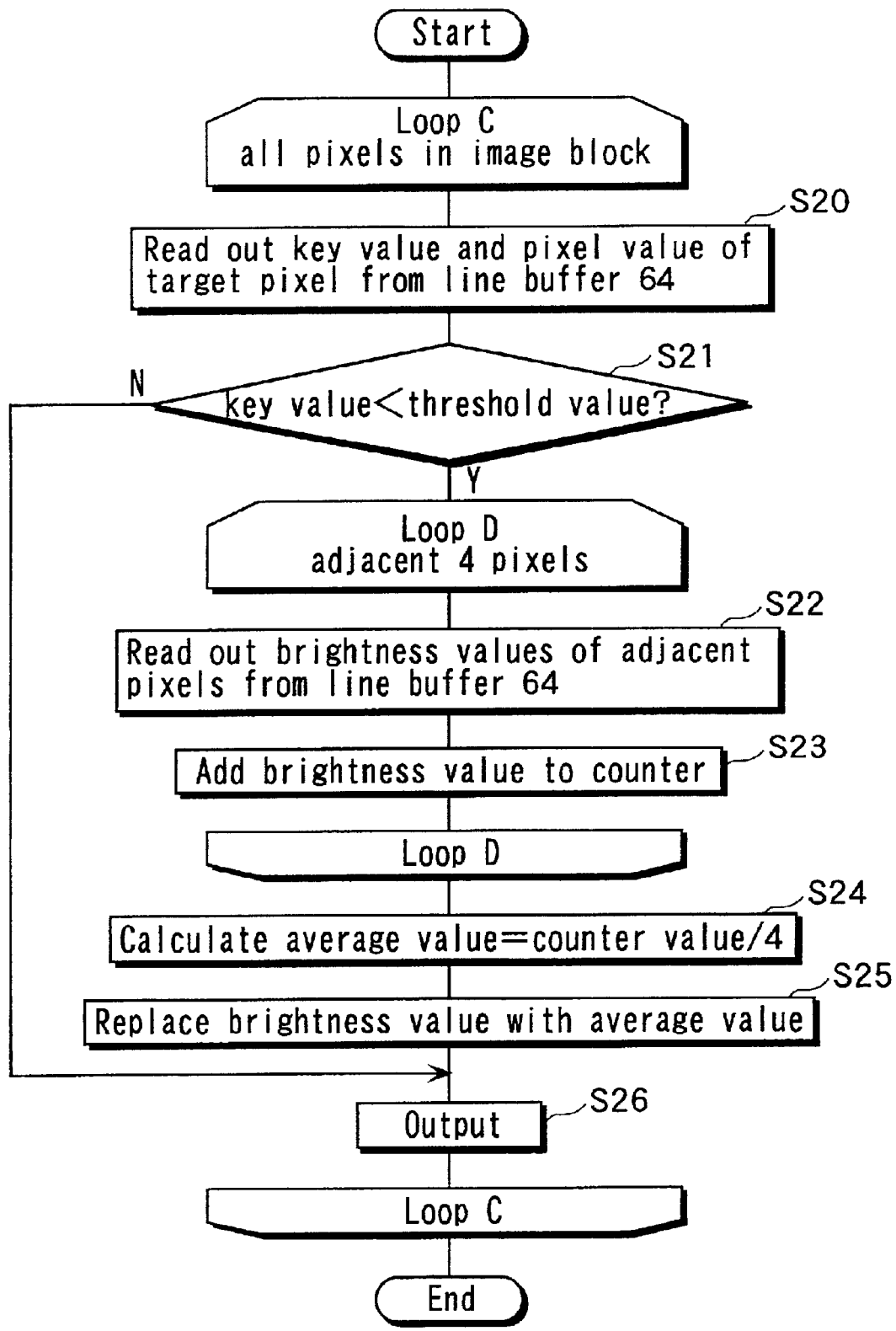
FIG. 12 is a flowchart showing an example of a processing procedure of the filter processing unit as shown in FIG. 8.

FIG. 12 is a flowchart showing an example of a processing procedure of the filter processing unit 65 as shown in FIG. 8. When the pixel values and key values of the pixels of 3 lines are written into the line buffer 64, the filter processing unit 65 targets a pixel in the image block (the targeted pixel is hereinafter referred to as a target pixel) in the above-mentioned scanning order and repeats sequentially the following average value calculation processing of the brightness values of the adjacent pixels (S20~S26) (Loop C).

Since there is no pixels adjacent to pixels located at the edges of each image block, such as pixels on the first line within the image block, an exceptional processing need be performed for these pixels in the following two-dimensional filtering processing. Here, however, calculation is performed according to the above-mentioned method, assuming that the adjacent pixels are background pixels if there are no pixels adjacent to the target pixel and the brightness values thereof are the average value found in Step S4 in FIG. 10. Also, after the filter processing unit 65 completes the processing for 2 lines, old data is sequentially overwritten by new data per pixel in the line buffer 64.

First, the filter processing unit 65 reads out a pixel value and a key value of a target pixel stored in the line buffer 64 (S20), and determines whether or not the read-out key value of the target pixel is smaller than the threshold value, that is, whether the target pixel is a background pixel or not (S21). If the key value of the target pixel is the threshold value or larger (an object pixel) as a result of the determination, it outputs the image signal of the pixel value read out from the line buffer 64 to the pixel selecting unit 15 (S26).

The filter processing unit 65 determines whether or not the read-out key value of the target pixel is smaller than a threshold value (S21), and if the key value of the target pixel is smaller than the threshold value (a background value) as a result of the determination, it repeats an addition processing for calculating the average value of the brightness values of upper, lower, right and left 4 pixels adjacent to the target pixel (S22~S23) (Loop D).

That is, the filter processing unit 65 reads out the brightness values among the pixel values of the adjacent pixels from the line buffer 64 (S22), and adds the read-out brightness values to the counter (S23).

After completing the processing of upper, lower, right and left 4 pixels adjacent to the target pixel, the filter processing unit 65 divides the value of the counter to which the brightness values of the 4 pixels were added by "4" so as to find the average value (S24), replaces the brightness value of the target pixel with the average value (S25), clears the counter, and then outputs the image signal of which the brightness value was replaced with the above average value to the pixel selecting unit 15 (S26).

When the filter processing unit 65 completes the above processing to all the pixels in the image block, it waits until data of pixels of 3 lines in a new image block are written in the line buffer 64, and repeats the processing as shown in the above flowchart for the data of the pixels in the new image block.

As described above, according to the pixel compensation unit 14, pixel values of background pixels are replaced with an average pixel value of object pixels in an image block including object pixels and background pixels. Therefore, there is an effect that the pixel values in the image block are uniform, and high frequency components of an image signal in a boundary between an object and a background are reduced to the frequency that changes in the unit of the image block.

Further, according to the pixel compensation unit 14, since background pixels in an image block are replaced with an average value of brightness values of the adjacent 4 pixels, a pixel value of an object pixel adjacent to a background pixel is reflected on the background pixel adjacent to the object pixel. Therefore, there is an effect that the background pixel can be interpolated by an alternate pixel value that does not deviate so much from the pixel value of the adjacent object pixel, and deterioration of image quality can be reduced, that is, image compression of higher quality can be achieved as well.

Figure 13:
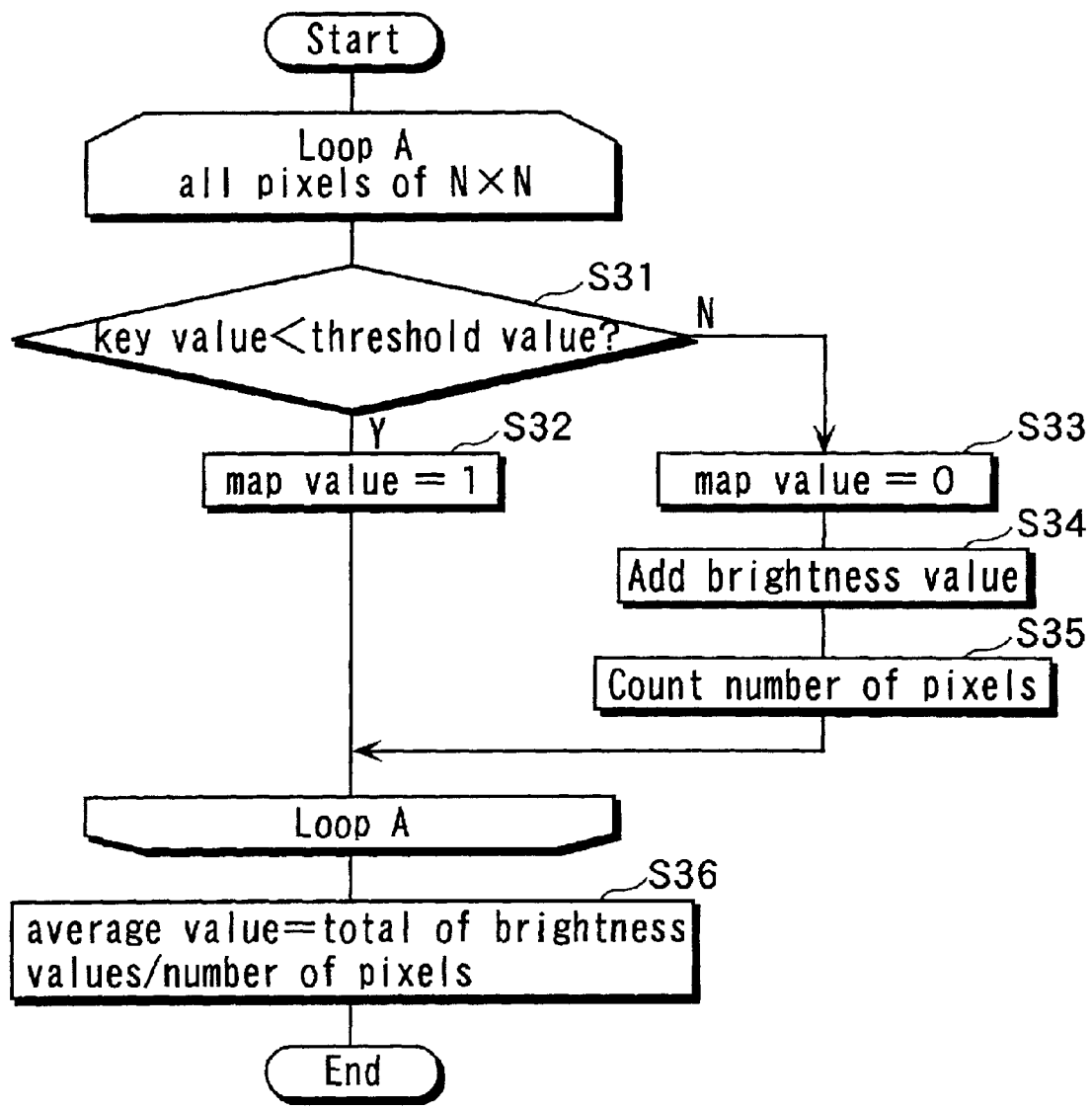
FIG. 13 is a flowchart showing a processing procedure of the pixel identification unit and the object pixel average value calculation unit as shown in FIG. 9.

FIG. 13 is a flowchart showing a processing procedure of the pixel identification unit 72 and the object pixel average value calculation unit 73 as shown in FIG. 9. A processing procedure of the pixel identification unit 72 and the object pixel average value calculation unit 73 will be explained specifically by using brightness values and key values of respective pixels as shown in FIG. 15A and FIG. 16A, respectively.

Figures 15A, 15B:
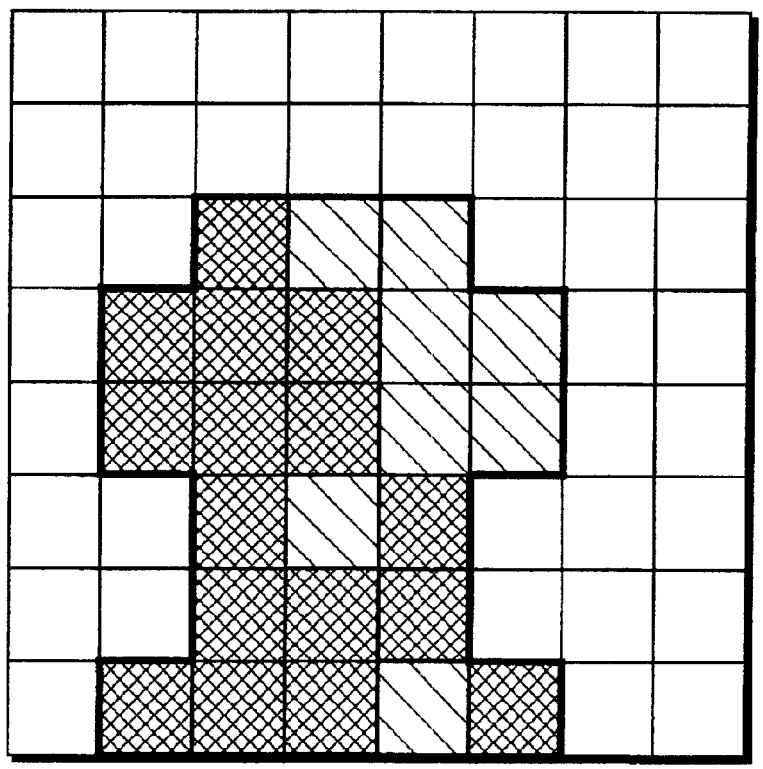
FIG. 15A is a diagram showing an example of brightness values of respective pixels among inputted data to the pixel compensation unit.
FIG. 15B is a diagram showing brightness of an inputted image that is displayed based on the inputted data as shown in FIG. 15A.

FIG. 15A is a diagram showing an example of brightness values of respective pixels among inputted data to the pixel compensation unit 14. FIG. 15B is a diagram showing brightness of an inputted image that is displayed based on the inputted data as shown in FIG. 15A. In FIG. 15A, a brightness value Y is $0 \leq Y \leq 255$. In FIG. 15B, in an image block of 8×8 pixels, a meshed portion indicates a pixel having a brightness value Y=255, a hatched portion indicates a pixel having a brightness value Y=150, and the others indicate pixels having a brightness value Y=0. As shown in FIG. 15B visually, since this block includes the pixel having a brightness value "255" adjacent to the pixel having a brightness value "0", the frequency of the image is very high.

Figures 16A, 16B:
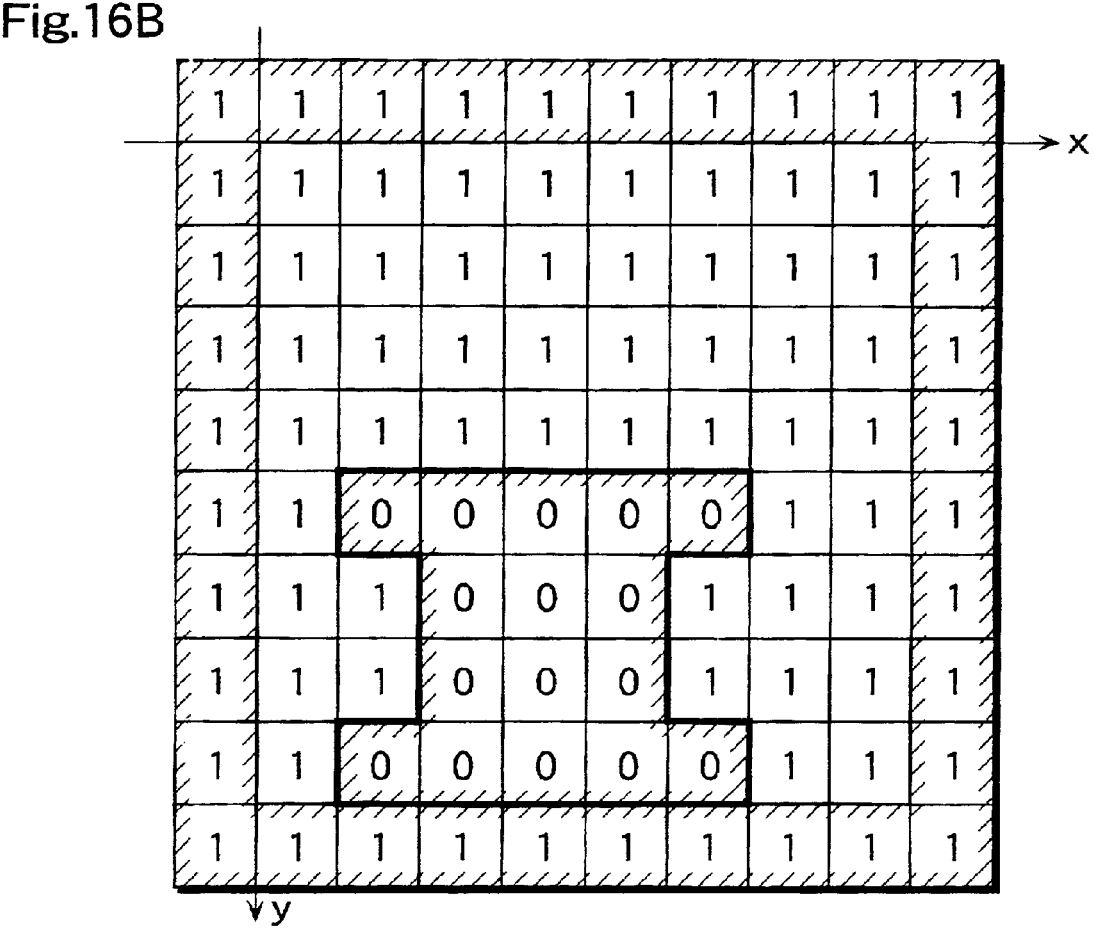
FIG. 16A is a diagram showing an example of key values that were calculated from a color difference of each pixel of the inputted data to the pixel compensation unit.
FIG. 16B is a diagram showing a padding map of the padding map storing unit that was found from the key values as shown in FIG. 16A by making a threshold value "100".

FIG. 16A is a diagram showing an example of key values that were calculated from a color difference of each pixel of the inputted data to the pixel compensation unit 14. FIG. 16B is a diagram showing a padding map of the padding map storing unit 74 that was found from the key values as shown in FIG. 16A by making a threshold value "100". The key values as shown in FIG. 16A indicate how far the chroma of respective pixels are from the blue chroma by the values of "0" through "255" when a parameter indicating a background is set to be blue in a chroma key. In this case, it is indicated that the closer to "255" the key value is, the closer to the flesh color that is opposite to the blue color the chroma of the pixel is, and the closer to "0" the key value is, the closer to the blue color the chroma of the pixel is.

In a padding map as shown in FIG. 16B, a map value in each pixel "0" indicates that the pixel is an object pixel, and "1" indicates that the pixel is a background pixel (a padding pixel). Also, the padding map as shown in FIG. 16B is structured to be a size of (N+2)×(N+2) pixels by combining the periphery comprised of pixels having a map value "1" with the image block of N×N pixels. Here, since the size of the image block is 8×8 pixels, that of the padding map is 10×10 pixels. Note that although the padding map storing unit 74 stores a padding map of this size, the padding map of this size need not be actually prepared, and two-dimensional filtering may be performed assuming that each pixel of the periphery of the image block is a padding pixel just for calculation.

In the pixel compensation unit 14 as shown in FIG. 9, a brightness value as shown in FIG. 15A, two color differences corresponding thereto, and a key value as shown in FIG. 16A for each pixel of N×N (N=8, in this case) pixels in an image block are inputted to the buffer memory 71 and the pixel identification unit 72 in parallel. The pixel identification unit 72 and the object pixel average value calculation unit 73 repeat sequentially the following average value calculation processing of brightness values and padding map generation processing (S31~S35) in parallel in the above-mentioned scanning order to all the pixels in the image block of N×N pixels (Loop A).

That is, since a pixel value and a key value of each pixel inputted to the pixel compensation unit 14 are sequentially written into the buffer memory 71 and inputted to the pixel identification unit 72 in parallel, the pixel identification unit 72 first compares the key value of the inputted pixel with the threshold value inputted by a user (S31), and if the key value of the pixel is smaller than the threshold value (a background pixel) as a result of the comparison, it writes a map value "1" indicating that the pixel is a padding pixel into the padding map storing unit 74 corresponding to the coordinate of the pixel (S32).

A pixel with a coordinate value (0, 0) as shown in FIG. 16A is, for example, a padding pixel because the key value "46" is smaller than the threshold value "100" (S31). Therefore, the pixel identification unit 72 writes "1" as a map value of the pixel with the coordinate value (0, 0) into the padding map storing unit 74 (S32), while the pixel value and key value of the pixel with the coordinate value (0, 0) is written into the buffer memory 71 in parallel.

Likewise, it is found that a pixel with a coordinate value (1, 0) as shown in FIG. 16A is, for example, a padding pixel because the key value "52" is smaller than the threshold value "100" (S31). In response to that, the pixel identification unit 72 writes "1" as a map value of the pixel with the coordinate value (1, 0) into the padding map storing unit 74 (S32), while the pixel value and key value of the pixel with the coordinate value (1, 0) is written into the buffer memory 71 in parallel with being written into the padding map storing unit 74. As for pixels having key values smaller than "100", same processing as the above is performed.

The pixel identification unit 72 compares the key value of the inputted pixel with the threshold value inputted by a user (S31), and if the key value of the pixel is the threshold value or larger (an object pixel) as a result of the comparison, it writes a map value "0" indicating that the pixel is an object pixel into the padding map storing unit 74 corresponding to the coordinate of the pixel (S33), and outputs the inputted pixel value to the object pixel average value calculation unit 73. Next, the object pixel average value calculation unit 73 adds the brightness value of the pixel inputted from the pixel identification unit 72 to a counter (S34), and then counts the number of the pixels (S35).

It is found that a pixel with a coordinate value (1, 4) as shown in FIG. 16A is, for example, an object pixel because the key value "148" thereof is the threshold value "100" or larger (S31). Therefore, the pixel identification unit 72 writes "0" as the map value of the pixel with the coordinate value (1, 4) into the padding map storing unit 74 (S33). Here, since the pixel is an object pixel, the following processing is further performed. That is, the object pixel average value calculation unit 73 acquires a brightness value "255" as shown in FIG. 15A among the pixel values of the pixel with the coordinate value (1, 4) inputted via the pixel identification unit 72, adds the acquired brightness value "255" to a counter that adds up brightness values (S34), and counts up the number of the pixel "1" (S35), while the pixel value and the key value of the pixel with the coordinate value (1, 4) are written in parallel into the buffer memory 71.

As for pixels having key values of "100" or larger with their coordinates (2, 4) through (5, 4), same processing as the above is performed.

In this way, in an image block of N×N (N=8 in FIG. 16A) pixels, a padding map of each pixel is sequentially formed per pixel in the scanning direction, a brightness value of a pixel having a key value of "100" or larger is added, and the number of pixels are counted, while a pixel value and a key value of each pixel are written into the buffer memory 71 as well. After completing the processing of all the pixels in the image block of N×N pixels, more specifically, after completing the above processing of the pixel with the coordinate value (7, 7) in FIG. 16A, the object pixel average value calculation unit 73 divides the value of the counter that adds up the brightness values by the number of counted pixels, so as to calculate the average value of the brightness values of the object pixels and output the calculation result to the alternate pixel supplying unit 75 (S36).

As a result, in the padding map storing unit 74, a map is finished for each of all the pixels in the image block, in which "0" or "1" indicating whether it is a padding pixel or an object pixel is written, and the average value of the brightness values of the object pixels is found in the object pixel average value calculation unit 73. Here, if the average value of the brightness values of the object pixels in this image block is calculated based on the brightness values as shown in FIG. 15A and the padding map as shown in FIG. 16B, it is 228 (a fraction is rounded down). The object pixel average value calculation unit 73 outputs the calculated average value of the brightness values to the alternate pixel supplying unit 75, and clears the counter used for addition processing of the brightness values (S34) and the counting processing of the number of pixels (S35). Also, while the average value of the brightness values of the object pixels is found, the writing of the pixel values and key values of all the pixels in the image block into the buffer memory 71 is completed.

Next, although the alternate pixel supplying unit 75 of the next part starts the processing for the image block as shown in the following flowchart, the pixel identification unit 72 and the object pixel average value calculation unit 73 wait for the alternate pixel supplying unit 75 to complete the processing to the pixels for 2 lines, and repeats the processing as shown in the above flowchart for a new image block of N×N pixels.

Figure 14:
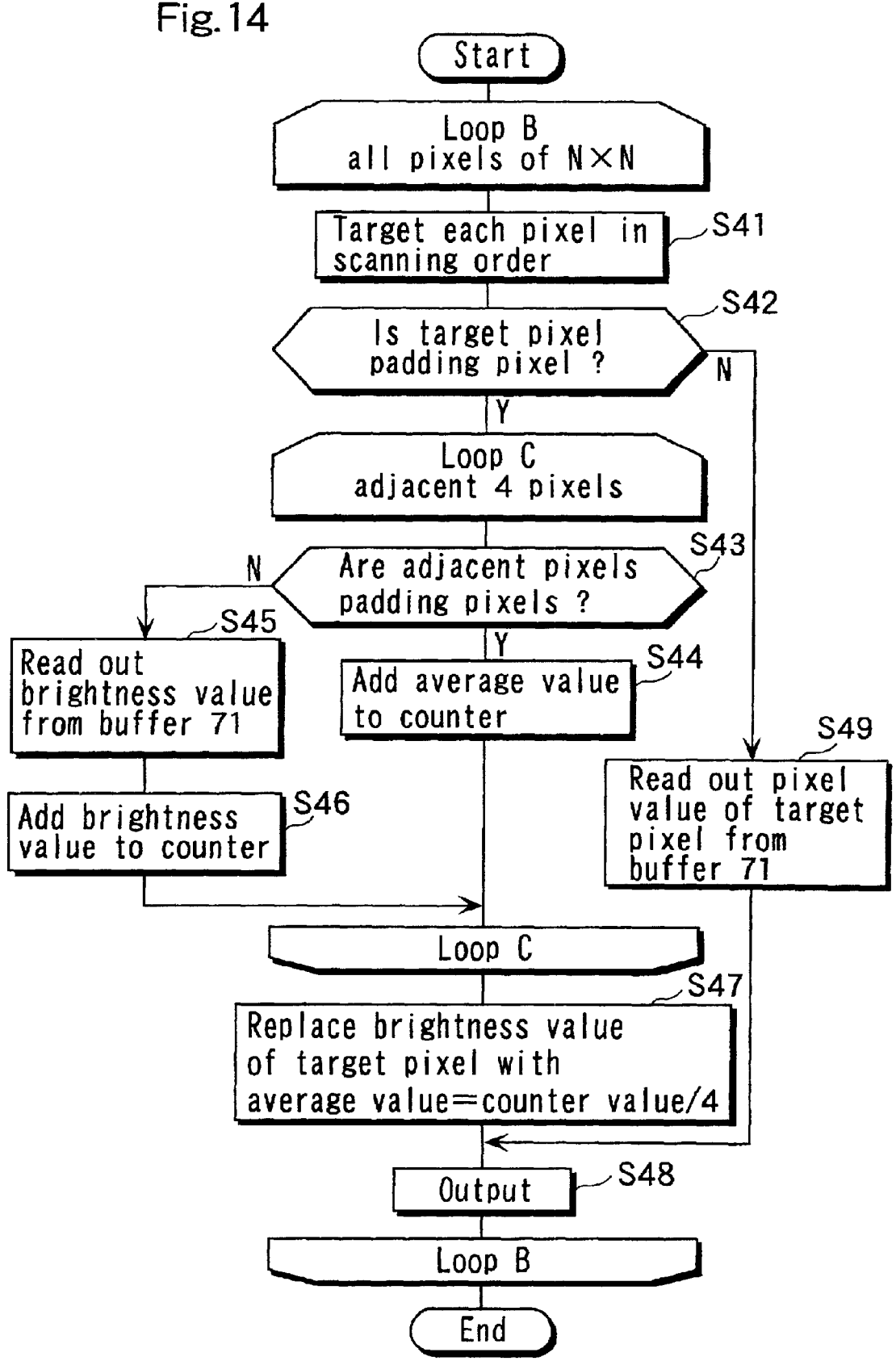
FIG. 14 is a flowchart showing an example of a processing procedure of the alternate pixel supplying unit 75 as shown in FIG. 9.

FIG. 14 is a flowchart showing an example of a processing procedure of the alternate pixel supplying unit 75 as shown in FIG. 9. The processing procedure of the alternate pixel supply unit 75 will be specifically explained as follows with reference to the result of the processing as shown in FIG. 17A by using brightness values and map values of respective pixels as shown in FIG. 15A and FIG. 16B. FIG. 17A is a diagram showing brightness values after the alternate pixel supplying unit 75 performs a two-dimensional filtering processing to the image block as shown in FIG. 15A by using the padding map as shown in FIG. 16B. FIG. 17B is a diagram showing the brightness values visually after the alternate pixel supplying unit 75 performs the two-dimensional filtering processing. FIG. 17C is a diagram showing a relation between brightness values of respective pixels in the image block as shown in FIG. 17A and hatchings as shown in FIG. 17B.

The alternate pixel supplying unit 75 stores the average value of the brightness values calculated by the object pixel average value calculation unit 73, and repeats sequentially the following two-dimensional filtering processing (S41~S48) for all the pixels in the image block of N×N pixels which were written in the buffer memory 71 in the above-mentioned scanning order (Loop B).

That is, the alternate pixel supplying unit 75 first targets each pixel in the above-mentioned scanning order (S41), and determines whether the target pixel is a padding pixel or not by referring to the map value of the padding map storing unit 74 (S42). As a result, if the target pixel is a padding pixel, the alternate pixel supplying unit 75 repeats the processing of calculating the average value of the brightness values of the upper, lower, right and left 4 pixels adjacent to the target pixel (S43~S46) (Loop C).

That is, the alternate pixel supplying unit 75 determines whether the adjacent pixels are padding pixels or not by referring to the map values in the padding map storing unit 74 (S43), and adds the average value of the stored brightness values to the counter if they are padding pixels (S44). If the adjacent pixels are not padding pixels as the result of the determination in Step S43, the alternate pixel supplying unit 75 reads out the brightness values of the adjacent pixels from the buffer memory 71 (S45), and adds the read-out brightness values to the counter (S46).

More specifically, the alternate pixel supplying unit 75 first targets the pixel of the coordinate value (0, 0), and refers to the padding map as shown in FIG. 16B. Since the map value of the pixel of the coordinate value (0, 0) is "1", it is a padding pixel (S42). Therefore, the alternate pixel supplying unit 75 finds the average value of the brightness values of the upper, lower, right and left pixels adjacent to the pixel of the coordinate value (0, 0) according to the following.

First, the padding map of the pixel of the coordinate value (0, −1) located on the pixel of the coordinate value (0, 0) that is a target pixel is referred to so as to determine whether the upper pixel is a padding pixel or not (S43). Since the pixel of the coordinate value (0, −1) is a pixel which is not included in the image block in FIG. 16B, it is a padding pixel of which the map value is "1". Brightness value of a padding pixel is replaced with an average value of brightness values of object pixels calculated in Step S36 in FIG. 13. Therefore, the alternate pixel supplying unit 75 adds the average value "228" to the counter that adds up the brightness values (S44).

Next, the padding map of the pixel of the coordinate value (1, 0) located on the right of the pixel of the coordinate value (0, 0) that is a target value is referred to so as to determine whether the right pixel is a padding pixel or not (S43). The pixel of the coordinate value (1, 0) is a padding pixel because the map value thereof is "1" in FIG. 16B. Therefore, the alternate pixel supplying unit 75 adds the average value "228" to the counter that adds up the brightness values (S44).

Next, the padding map of the pixel of the coordinate value (0, 1) located below the pixel of the coordinate value (0, 0) that is a target pixel is referred to so as to determine whether the, lower pixel is a padding pixel or not (S43). The pixel of the coordinate value (0, 1) is a padding pixel because the map value thereof is "1" in FIG. 16B. Therefore, the alternate pixel supplying unit 75 adds the average value "228" to the counter that adds up the brightness values (S44).

Finally, the padding map of the pixel of the coordinate value (−1, 0) located on the left of the pixel of the coordinate value (0, 0) that is a target pixel is referred to so as to determine whether the left pixel is a padding pixel or not (S43). Since the pixel of the coordinate value (−1, 0) is a pixel which is not included in the image block in FIG. 16B, it is a padding pixel of which the map value is "1". Therefore, the alternate pixel supplying unit 75 adds the average value "228" to the counter that adds up the brightness values (S44).

After the processing to the upper, lower, right and left 4 pixels adjacent to the target pixel is completed, the alternate pixel supplying unit 75 divides the value of the counter to which the brightness values of the 4 pixels are added by "4" to find the average value of the brightness values, replaces the brightness value of the target value with the average value (S47), and then clears the counter and outputs the brightness value which was replaced with the average value to the pixel selecting unit 15 (S48).

More specifically, if the pixel of the coordinate value (0, 0) is a target pixel as described above, the value of the counter that adds up the brightness values is "912" because the upper, lower, right and left adjacent 4 pixels are all padding pixels, and the average value of the 4 pixels adjacent to the target pixel is "228". The alternate pixel supplying unit 75 as shown in FIG. 17A replaces the brightness value "0" of the target pixel with the average value "228" of the brightness values of the adjacent 4 pixels (S47), and outputs the brightness value "228" to the pixel selecting unit 15 (S48).

As for the target pixels of the coordinate values up to (0, 3), the average value "228" of the brightness values of the adjacent 4 pixels is found in the same manner as above, and the brightness value that is replaced with the average value "228" is outputted to the pixel selecting unit 15.

Next, the pixel of the coordinate value (1, 3) is targeted. The pixel of the coordinate (1, 3) is different from the pixels as described above. That is, any of the adjacent pixels of the pixel of the coordinate (1, 3) is an object pixel, as it is found if the padding map is referred to. When the padding map is referred to by targeting the pixel of the coordinate value (1, 3), the target pixel is a padding pixel because the map value thereof is "1" (S42). Therefore, the alternate pixel supplying unit 75 finds the average value of the brightness values of the upper, lower, right and left 4 pixels adjacent to the pixel of the coordinate value (1, 3).

First, the padding map of the pixel of the coordinate value (1, 2) located on the target pixel of the coordinate value (1, 3) is referred to determine whether the upper pixel is a padding pixel or not (S43). The pixel of the coordinate value (1, 2) is a padding pixel because the map value thereof is "1" in FIG. 16B. Therefore, the alternate pixel supplying unit 75 adds the average value "228" to the counter that adds up the brightness values (S44).

Next, it is determined whether the pixel of the coordinate value (2, 3) on the right of the target pixel is a padding pixel or not (S43). Since the pixel of the coordinate value (2, 3) is a padding pixel because the map value thereof is "1" in FIG. 16B, the alternate pixel supplying unit 75 adds the average value "228" to the counter that adds up the brightness values (S44).

Further, it is determined whether the pixel of the coordinate value (1, 4) below the target pixel is a padding pixel or not (S43). The pixel of the coordinate value (1, 4) is an object pixel because the map value thereof is "0" in FIG. 16B. Therefore, the alternate pixel supplying unit 75 reads out the brightness value "255" of the pixel of the coordinate value (1, 4) as shown in FIG. 15A from the buffer memory 71 (S45), and adds the read-out brightness value "255" to the counter that adds up the brightness values (S46).

Finally, it is determined whether the pixel of the coordinate value (0, 3) on the left of the target pixel is a padding pixel or not (S43). The pixel of the coordinate value (0, 3) is a padding pixel because the map value thereof is "1" in FIG. 16B. Therefore, the alternate pixel supplying unit 75 adds the average value "228" to the counter that adds up the brightness values (S44).

If the pixel of the coordinate value (1, 3) is a target pixel as described above, the value of the counter that adds up the brightness values is "939", and the average value of the brightness values of the 4 pixels adjacent to the target pixel is "234". As shown in FIG. 17A, the alternate pixel supplying unit 75 replaces the brightness value "255" of the target value with the average value "234" of the brightness values of the adjacent 4 pixels (S47), and outputs the image signal thereof to the pixel selecting unit 15 (S48).

Further, the pixel of the coordinate value (2, 3) is targeted. The pixel of the coordinate value (2, 3) is different from the pixels described above. That is, the brightness value of one of the adjacent pixels of the pixel of the coordinate value (2, 3) is replaced by the alternate pixel supplying unit 75.

If the pixel of the coordinate value (2, 3) is targeted, this pixel is a padding pixel because the map value thereof is "1" (S43). Similarly to the case where the pixel of the coordinate value (1, 3) is targeted, the average value of the upper, lower, right and left 4 pixels adjacent to the target pixel is also found in this case, and the brightness value of the pixel of the coordinate value (1, 3) on the left of the target pixel has been replaced with "234" just before it. Here, assume that if adjacent pixels are padding pixels, the brightness values that were replaced by a two-dimensional filtering are not used as brightness values of the adjacent pixels, and the average value calculated by the object pixel average value calculation unit 73 is used uniformly. In this case, since the pixel of the coordinate value (1, 4) below the target pixel of the coordinate value (2, 3) is only an object pixel, the average value of the adjacent pixels is "234" if it is calculated by reading out the brightness value "255" from the buffer memory 71. As shown in FIG. 17A, the alternate pixel supplying unit 75 replaces the brightness value "255" of the target pixel with the average value "234" of the brightness values of the adjacent 4 pixels (S47), and outputs the replaced brightness value to the pixel selecting unit 15 (S48).

The average value of the brightness values of the upper, lower, right and left pixels adjacent to each pixel of the coordinate value up to (0, 4) is found in the same manner as discussed above, and the brightness value which was replaced with the average value is outputted to the pixel selecting unit 15 (S47, S48).

In the scanning order, each pixel in the image block is targeted (S41), the map value in the padding map storing unit 74 is referred to, and it is determined whether the target pixel is a padding pixel or not (S42). And as a result, if the target pixel is not a padding pixel, the alternate pixel supplying unit 75 reads out the brightness value of the pixel from the buffer memory 71 (S49) and outputs it to the pixel selecting unit 15 (S48).

More specifically, the pixel of the next coordinate value (1, 4) is an object pixel because the map value thereof is "0" if the padding map as shown in FIG. 16B is referred to (S42). The alternate pixel supplying unit 75 does not perform a two-dimensional processing to the object pixel. Instead, it reads out the brightness value "255" of the pixel of the coordinate value (1, 4) from the buffer memory 71 (S41), and outputs the brightness value to the pixel selecting unit 15, as shown in FIG. 17A (S48). As for the pixels of the coordinate values up to (5, 4), the brightness values "255", "255", "150" and "150" which were read out from the buffer memory 71 by the alternate pixel supplying unit 75 are sequentially outputted to the pixel selecting unit 15, as shown in FIG. 17A. Also, the method of the two-dimensional processing to each of the following pixels of the coordinate values (6, 4), (7, 4) and (0, 5) in the scanning order is as described above.

Next, the pixel of the coordinate value (1, 5) is targeted. The pixel of the coordinate value (1, 5) is different from the above-mentioned pixels in that two of the adjacent pixels are object pixels. The target pixel is a padding pixel because the map value thereof is "1". If the two-dimensional filtering is performed by finding the average value of the upper, lower, right and left 4 pixels adjacent to the target pixel, since the lower and left 2 pixels adjacent to the target pixel are padding pixels and the average value of the brightness values of the object pixels which has been already found as the brightness values of the 2 adjacent pixels is used, the buffer memory 71 need not be referred to. On the other hand, since the upper and right 2 pixels adjacent to the target pixel, that is, the pixels of the coordinate values (1, 4) and (2, 5) are object pixels because both of the map values thereof are "0", the buffer memory 71 need be referred to for each pixel in order to read out the brightness value thereof. That is, the buffer memory 71 must be referred to twice. In this case, since the brightness values of the lower and left 2 pixels adjacent to the target pixel are both "228" and those of the upper and right 2 pixels are both "255" as shown in FIG. 15A, the value of the counter that adds up the brightness values is "966", and the average value of the brightness values of the adjacent 4 pixels is "241". As shown in FIG. 17A, the alternate pixel supplying unit 75 replaces the brightness value of the pixel of the coordinate value (1, 5) with the average value "241", and outputs the replaced brightness value to the pixel selecting unit 15. The two-dimensional filtering is performed for all of the following pixels in the image block in the same way as described above so as to replace the brightness values thereof.

After completing the processing to all the pixels in the image block of N×N pixels, the alternate pixel supplying unit 75 repeats the processing as shown in the above flowchart to a new image block of N×N pixels.

As shown in FIG. 17B, if the image of the image block to which the alternate pixel supplying unit 75 performed the padding and the two-dimensional filtering is compared with the original image when it was inputted as shown in FIG. 15B, it is found that the brightness values of the former image are interpolated over the background pixels. In addition, since the pixel value of the object pixel is well reflected in the padding pixels adjacent to the object pixel by the two-dimensional filtering in FIG. 17B, it can be said that the image quality is preserved more precisely.

As described above, the filter processing unit 65 as shown in FIG. 8 must always refer to the line buffer 64 for 4 pixels surrounding each padding pixel when it performs a two-dimensional processing to the padding pixel. However, according to the alternate pixel supplying unit 75 as shown in FIG. 9, the number of times that the buffer memory 71 is referred to can be drastically reduced by referring to the conditions (the map values) of the 4 pixels surrounding the padding pixel which are stored in the padding map storing unit 74. Since the data stored in the padding map storing unit 74 has 2 values, while the data stored in the line buffer 64 and the buffer memory 71 has multiple values in general, the two-dimensional filtering processing can be performed by referring to less data quantity, and thereby a bus band can be effectively used for accessing an image memory. As a result, there is a further effect that power consumption of the image object content generation device 10 can be drastically reduced.

Also, in FIG. 9, a same result as an alternate pixel value compensation processing to a padding pixel can be obtained by generating a padding map, and a processing for generating the padding map is performed in parallel with an average value calculation processing as well. Therefore, the result can be obtained more quickly in FIG. 9 than in the pixel compensation unit 14 as shown in FIG. 8 that performs an alternate pixel value compensation processing and an average value calculation processing to a padding pixel in serial. In addition, since the padding map storing unit 74 does not require as much memory capacity as the line buffer 64 that stores a pixel value and a key value of each pixel, there is an effect that the circuit scale of the image object content generation device 10 can be reduced.

FIG. 18 is a diagram showing a number of times that the buffer memory 71 is referred to per pixel of the image block in the two-dimensional filtering of the alternate pixel supplying unit 75. As described above, it is only when a target pixel is a padding pixel and adjacent to an object pixel that the brightness values of the pixels adjacent to the target pixel need be read out from the buffer memory 71 when the alternate pixel supplying unit 75 performs the two-dimensional filtering. Also, the buffer memory 71 need not be referred to because whether the target pixel is a padding pixel can be found only if the padding map is referred to. As shown in FIG. 18, the number of times that the buffer memory 71 is referred to regarding the brightness values of the adjacent pixels in the image block is 1 for the pixels of the coordinate values (1, 3) through (5, 3), (0, 4), (6, 4), (0, 7) and (6, 7) respectively. Also, the buffer memory 71 is referred to 2 times regarding the pixels of the coordinate values of (1, 5), (5, 5), (1, 6) and (5, 6) respectively because two of the pixels adjacent to each of these pixels are object pixels. The buffer memory 71 is referred to 0 times regarding the hatched portion of the object pixels as shown in FIG. 18 because the two-dimensional filtering is not performed to the object pixels.

As compared with the above, although the line buffer 64 is referred to 0 times regarding brightness values of pixels adjacent to an object pixel because the pixel compensation unit 14 as shown in FIG. 8 does not perform the two-dimensional filtering to the object pixels, a key value of a target pixel needs to be read out from the line buffer 64 to determine whether the pixels are object pixels or not. Also, as to background pixels, the key value of each of the target pixels needs to be read out to determine whether the target pixel is an object pixel or not, and further, the brightness values of the 4 pixels adjacent to the pixel must be read out from the line buffer 64.

Therefore, according to the pixel compensation unit 14 as shown in FIG. 9, there is an effect that the number of times that an image memory is referred to can be drastically reduced as compared with the pixel compensation unit 14 as shown in FIG. 8.

On the contrary, in the pixel compensation unit 14 as shown in FIG. 9, a new processing of reading out a map value from the padding map storing unit 74 is added, while the number of times that pixel values are read out from the buffer memory 71 regarding 4 pixels adjacent to a target pixel is reduced. However, a brightness value and a color difference are data of 8 bits respectively, while a map value is data of 1 bit at most. Therefore, if the pixel compensation unit 14 in FIG. 8 and that in FIG. 9 are compared, it is found that a bus band for accessing an image memory can be much more drastically reduced between the buffer memory 71 and the alternate pixel supplying unit 75 than between the line buffer 64 and the filter processing unit 65. Further, an average value is read out from the object pixel average value calculation unit 73 a number of times as many as the number of times that the alternate pixel supplying unit 75 reads out pixel value from the buffer memory 71 is reduced, and the number of bits indicating the average value is 8. However, since an address is not required for reading out the average value from the object pixel average value calculation unit 73, unlike for reading out a pixel value from an image memory, the alternate pixel supplying unit 75 need not generate an address signal, and thereby a bus band can be reduced as much as the address value is transmitted to the image memory. As a result, there is an effect that the reduced bus band can be allocated to another processing, otherwise power consumption of the image object content generation device 10 can be sufficiently reduced.

Figure 19:
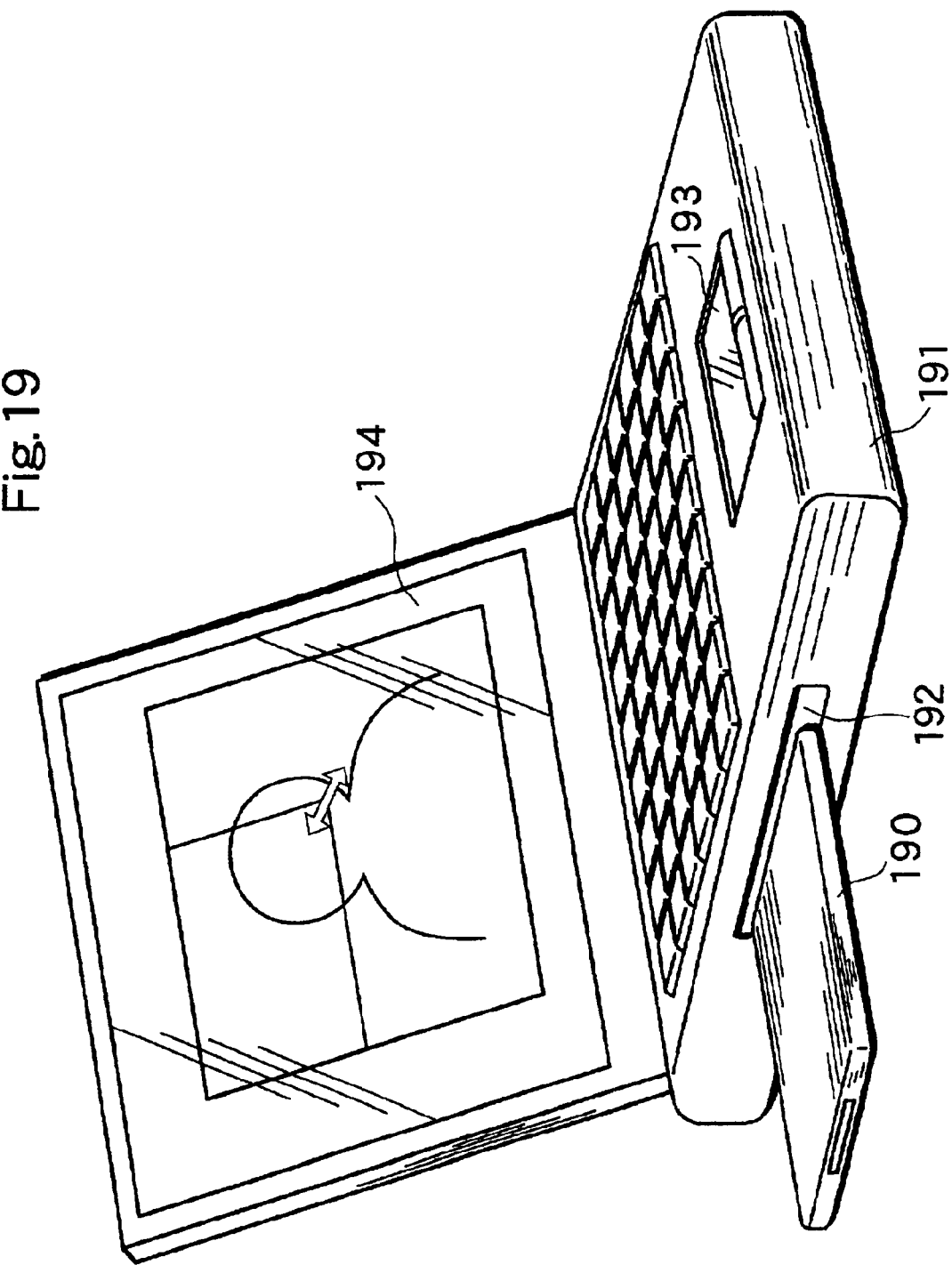
FIG. 19 is a diagram showing an example applicable to an actual product of the image object content generation device.

FIG. 19 is a diagram showing an example applicable to an actual product of the image object content generation device 10. A PC card 190 is a card board on which the image object content generation device 10 of the embodiment as shown in FIG. 3 is mounted as a logic circuit. A personal computer 191 comprises a processing unit including a CPU, a memory unit including a hard disk, an external connection unit including a card slot 192, an operation unit including a touch pad 193, and a display unit including a liquid crystal display panel 194. An image editing program for editing an image, such as a picture read out into a digital camera or a scanner, or driver software for using the PC card 190 as an engine for editing the image and others are installed in the hard disk of the personal computer 191. The card slot 192 is an insert slot for inserting the PC card 190 into the personal computer 191. The touch pad 193 is an operation unit for operating a pointer on the image that is displayed on the liquid crystal display panel 194. The liquid crystal display panel 194 is a display unit for displaying an editing image or sentence, an operational instruction to a user or an operational condition according to various programs, and others.

By using the image editing program and the PC card 190, a user can perform editing, such as enlarging/reducing a frame size of an image read out from outside, or enlarging/reducing only an object of an image to paste it to another image on the personal computer 191 at a high speed.

As described above, according to the image object content generation device of the embodiment, an inputted image signal can be divided into image object content and background content and outputted selectively, that is, an image signal to which a padding processing was performed is outputted if the image object content is outputted. The padding processing is performed in fewer processes and a memory is referred to fewer times than a conventional one, and a memory band can be effectively used. Also, discontinuity between image blocks to which the padding processing was performed can be improved, and a real time processing by hardware including change of a frame size and selection of an image to be outputted becomes possible.

Although the image object content generation device of the present invention was explained based on the embodiment thereof, the present invention is not limited to the embodiment thereof.

Although a background pixel in each image block is a padding pixel in the above embodiment, for example, an object pixel in each image block may be a padding pixel. Also, although a pixel value of a padding pixel is replaced with an average value of pixel values of object pixels, it may be replaced with an average value of pixel values of background pixels. In any method, change of an image signal can be smoothed in a unit of a block so as to perform a high quality padding processing.

Also, the image object content generation device according to the present invention may comprise means for cutting out an object from an inputted image data. That is, key generation, size change, high frequency removal, pixel compensation (i.e., padding) and others may be performed to the cut-out object.

Also, in the above embodiment, the image data storing unit 16 always stores image data from the pixel selecting unit 15 in a buffer memory. Instead, the image data storing unit 16 may operate by selecting whether it stores the image data or makes the data pass as it is according to an external instruction.

Further, according to the Low Pass Extrapolation padding algorithm of the embodiment, a two-dimensional filtering processing is performed for taking an average of pixel values of upper, lower, right and left 4 pixels. However, the present invention is not limited to this embodiment as a filtering processing, and another filtering processing, such as a Gaussian filter, may be applied.

What is claimed is:

1. An image object content generation device comprising:
   a key generation unit operable to generate a key signal that is a reference to distinguish an object pixel from a background pixel per pixel of an inputted image signal;
   a frame size changing unit operable to change a frame size of the image signal;
   a low frequency component passing unit operable to remove high frequency components of the image signal which was processed in the frame size changing unit;
   a pixel compensation unit operable to perform a padding processing, according to Low Pass Extrapolation padding algorithm, to the image signal which was processed in the low frequency component passing unit based on the key signal generated by the key generation unit; and
   a pixel selecting unit operable to select one of the image signal which was processed in the low frequency component passing unit and the image signal which was processed in the pixel compensation unit.

2. The image object content generation device according to claim 1,
   wherein the key generation unit includes a reference value inputting unit operable to accept an input of a reference value for generating the key signal of the image signal, and
   the key generation unit generates the key signal of the image signal based on the reference value.

3. The image object content generation device according to claim 2,
   wherein the frame size changing unit includes a scale factor inputting unit operable to accept an input of a scale factor for scaling-up, scaling-down or not scaling the frame size, and
   the frame size changing unit changes the frame size according to the inputted scale factor.

4. The image object content generation device according to claim 3,
   wherein the low frequency passing unit includes a selecting unit operable to perform a low frequency passing processing to the inputted image signal if a frame size changing processing is performed by the frame size changing unit for scaling down, and outputs the image signal unchanged if a frame size changing processing is performed for scaling up.

5. The image object content generation device according to claim 4, further comprising an image data storing unit having a memory area operable to store output data of the pixel selecting unit.

6. The image object content generation device according to claim 5,
   wherein the image data storing unit operates, according to an instruction from outside, by selecting whether or not an image signal is stored.

7. The image object content generation device according to claim 1,
   wherein the pixel compensation unit includes:
   a buffer memory operable to store values of image signals and key values for an image block comprising N×N (N is a natural number) pixels;
   an average value calculation unit operable to, in the image block, add up values of image signals of pixels having key values of a preset threshold value or larger, count a number of the pixels, and find an average value of the values of the image signals of the pixels;
   a padding processing unit operable to read out a key value stored in the buffer memory, detect a pixel having a key value smaller than the threshold value, and replace a value of the image signal of the pixel with the average value found by the average value calculation unit;
   a buffer memory operable to store values of image signals for 2N pixels outputted from the padding processing unit; and
   a filter processing unit operable to read out a key value stored in the buffer memory for a pixel, refer to the buffer memory regarding values of image signals of upper, lower, right and left four pixels adjacent to the pixel if detected that the read-out key value of the pixel is smaller than the threshold value and replace a value of an image signal of the detected pixel with an average value of the adjacent 4 pixels.

8. The image object content generation device according to claim 1,
   wherein the pixel compensation unit includes:
   a buffer memory operable to store a value of an image signal and a key value of each pixel which is sequentially inputted;
   an alternate pixel value generation unit operable to generate an alternate pixel value of an image signal of an object pixel based on the key value of each pixel which is sequentially inputted;
   a padding pixel location storing unit operable to store information indicating a location of a padding pixel based on the key value of each pixel which is sequentially inputted; and
   a filtering unit operable to specify a padding pixel by referring to the padding pixel location storing unit, and perform a filtering processing to the specified padding pixel by using the alternate pixel value and the value of the image signal in the buffer memory.

9. The image object content generation device according to claim 8,
  wherein the alternate pixel value generation unit includes a padding pixel average value calculation unit operable to detect object pixels based on key values and calculate an average value of values of image signals of the detected object pixels, and
  the filtering unit performs the filtering processing by using the average value calculated by the padding pixel average value calculation unit as the alternate pixel value.

10. The image object content generation device according to claim 9,
  wherein the filtering unit includes:
    an alternate pixel value storing unit operable to store the alternate pixel value;
    a padding pixel detecting unit operable to sequentially target each pixel of which the value of the image signal and the key value are stored in the buffer memory, and detect whether or not the target pixel is a padding pixel;
    an adjacent pixel value reading-out unit operable to read out the alternate pixel value from the alternate pixel value storing unit if an adjacent pixel surrounding the detected padding pixel is a padding pixel, and read out a respective value of an image signal from the buffer memory if an adjacent pixel surrounding the padding pixel is an object pixel; and
    an adjacent pixel average value calculation unit operable to calculate an average value of the alternate pixel value and the value of the image signal of adjacent pixels which were read out by the adjacent pixel value reading-out unit, and
  the filtering unit replaces the value of the image signal of the detected padding pixel with the average value calculated by the adjacent pixel value calculation unit.

11. The image object content generation device according to claim 10,
  wherein the adjacent pixel value reading-out unit determines whether or not the adjacent pixels surrounding the detected padding pixel are padding pixels by referring to the padding pixel location storing unit.

12. The image object content generation device according to claim 11,
  wherein the padding pixel location storing unit stores information indicating locations of padding pixels of an image block of (N+2)×(N+2) pixels (N is a natural number) by placing padding pixels of one pixel in width on a periphery of the image block of N×N pixels.

13. The image object content generation device according to claim 8,
  wherein the padding pixel location storing unit stores data of 1 bit for each pixel indicating whether or not each pixel is a background pixel corresponding to the location of each pixel in the image block.

14. A padding device for smoothing a boundary between a background and an object by replacing a pixel value of a padding pixel, which was determined to be one of a background pixel and an object pixel, with an alternate pixel value in an image block including both background pixels and object pixels, the padding device comprising:
  an image data storing unit operable to store a pixel value of a pixel in the image block;
  an alternate pixel value storing unit operable to store the alternate pixel value;
  a map storing unit operable to store a map indicating a location of a padding pixel in the image block; and
  a filtering unit operable to filter the padding pixel in the image block with reference to the map by using the alternate pixel value as the pixel value of the padding pixel,
  wherein the map stores data of 1 bit for each pixel indicating whether or not each pixel is a padding pixel corresponding to a location of each pixel in the image block.

15. A padding device for smoothing a boundary between a background and an object by replacing a pixel value of a padding pixel, which was determined to be one of a background pixel and an object pixel, with an alternate pixel value in an image block including both background pixels and object pixels, the padding device comprising:
  an image data storing unit operable to store a pixel value of a pixel in the image block;
  an alternate pixel value storing unit operable to store the alternate pixel value;
  a map storing unit operable to store a map indicating a location of a padding pixel in the image block; and
  a filtering unit operable to filter the padding pixel in the image block with reference to the map by using the alternate pixel value as the pixel value of the padding pixel,
  wherein the map has a size of (N+2)×(N+2) pixels by placing padding pixels of one pixel in width on a periphery of the image block, if the image block is a size of N×N pixels.

16. The padding device according to claim 15,
  wherein the filtering unit targets a pixel in the image block, determines whether or not the target pixel is a padding pixel by referring to the map, and when the target pixel is determined to be a padding pixel, reads out the alternate pixel value stored in the alternate pixel value storing unit according to the map if a pixel adjacent to the target pixel is a padding pixel, and reads out a respective pixel value of a pixel adjacent to the target pixel from the image data storing unit if the pixel adjacent to the target pixel is not a padding pixel, so as to calculate an average value of pixel values of adjacent pixels and replace the pixel value of the target pixel with the found average value.

17. A padding device for smoothing a boundary between a background and an object by replacing a pixel value of a padding pixel, which was determined to be one of a background pixel and an object pixel, with an alternate pixel value in an image block including both background pixels and object pixels, the padding device comprising:
  an image data storing unit operable to store a pixel value of a pixel in the image block;
  an alternate pixel value storing unit operable to store the alternate pixel value;
  a map storing unit operable to store a map indicating a location of a padding pixel in the image block; and
  a filtering unit operable to filter the padding pixel in the image block with reference to the map by using the alternate pixel value as the pixel value of the padding pixel,
  wherein the filtering unit targets a pixel in the image block, determines whether or not the target pixel is a padding pixel or not by referring to the map, and when the target pixel is determined to be a padding pixel, reads out the alternate pixel value stored in the alternate pixel value storing unit according to the map if a pixel adjacent to the target pixel is a padding pixel, and reads out a respective pixel value of a pixel adjacent to the target pixel from the image data storing unit if the pixel adjacent to the target pixel is not a padding pixel, so as to calculate an average value of pixel values of adjacent pixels and replace the pixel value of the target pixel with the found average value.

18. A padding device for smoothing a boundary between a background and an object by replacing a pixel value of a padding pixel, which was determined to be one of a background pixel and an object pixel, with an alternate pixel value in an image block including both background pixels and object pixels, the padding device comprising:
    an image data storing unit operable to store a pixel value of a pixel in the image block;
    an alternate pixel value storing unit operable to store the alternate pixel value;
    a map storing unit operable to store a map indicating a location of a padding pixel in the image block;
    a filtering unit operable to filter the padding pixel in the image block with reference to the map by using the alternate pixel value as the pixel value of the padding pixel; and
    an identification unit operable to identify whether or not a pixel is a padding pixel based on a key value corresponding to the pixel, store a result of the identification in the map storing unit as the map.

19. The padding device according to claim 18, further comprising an alternate pixel value generation unit operable to calculate an average value of pixel values of pixels which were determined not to be padding pixels by the identification unit, and store the average value in the alternate pixel value storing unit as the alternate pixel value.

20. The padding device according to claim 19, further comprising a pixel value writing-in unit operable to store in the image data storing unit a pixel value of each pixel which is sequentially inputted,
    wherein the identification unit identifies each pixel which is sequentially inputted while the pixel value writing-in unit writes in the pixel value of the pixel.

21. An image object content generation method comprising:
    a key generation operation of generating a key signal that is a reference for distinguishing an object pixel from a background pixel per pixel of an inputted image signal;
    a frame size changing operation of changing a frame size of the image signal;
    a low frequency component passing operation of removing high frequency components of the image signal which was processed in the frame size changing operation;
    a pixel compensations operation of performing a padding processing, according to Low Pass Extrapolation padding algorithm, to the image signal which was processed in the low frequency component passing operation based on the key signal which was generated in the key generation operation; and
    a pixel selecting operation of selecting one of the image signal which was processed in the low frequency component passing operation and the image signal which was processed in the pixel compensation operation.

22. The image object content generation method according to claim 21,
    wherein the pixel compensation operation includes:
    a buffer memory writing-in operation of writing a value of an image signal and a key value of each pixel which is sequentially inputted in a buffer memory;
    an alternate pixel value generation operation of generating an alternate pixel value of an image signal of an object pixel based on the key value of each pixel which is sequentially inputted;
    a padding pixel location writing-in operation of writing information indicating a location of a padding pixel in a padding pixel location storing unit based on the key value of each pixel which is sequentially inputted; and
    a filtering operation of specifying a padding pixel by referring to the padding pixel location storing unit and performing a filtering processing to the specified padding pixel by using the alternate pixel value and the value of the image signal in the buffer memory.

23. A padding method for smoothing a boundary between a background and an object by replacing a pixel value of a padding pixel, which was determined to be one of a background pixel and an object pixel, with an alternate pixel value in an image block including both background pixels and object pixels, the padding method comprising:
    an image memory writing-in operation of writing a pixel value of a pixel in the image block in an image memory;
    an alternate pixel value generation operation of generating the alternate pixel value and storing the alternate pixel value in an alternate pixel value storing unit;
    a map generation operation of making a map indicating a location of a padding pixel in the image block and storing the map in a map storing unit; and
    a filtering operation of filtering a padding pixel in the image block with reference to the map by using the alternate pixel value as the pixel value of the padding pixel,
    wherein the map stores data of 1 bit for each pixel indicating whether or not each pixel is a padding pixel corresponding to a location of each pixel in the image block.

24. A program embodied on a computer readable medium for use with a computer, the program comprising:
    a key generation operation of generating a key signal that is a reference for distinguishing an object pixel from a background pixel per pixel of an inputted image signal;
    a frame size changing operation of changing a frame size of the image signal;
    a low frequency component passing operation of removing high frequency components of the image signal which was processed in the frame size changing operation;
    a pixel compensation operation of performing a padding processing, according to Low Pass Extrapolation padding algorithm, to the image signal which was processed in the low frequency component passing operation based on the key signal which was generated in the key generations operation; and
    a pixel selecting operation of selecting one of the image signal which was processed in the low frequency component passing operation and the image signal which was processed in the pixel compensations operation.

25. The program according to claim 24,
    wherein the pixel compensation operation includes:
    a buffer memory writing-in operation writing a value of an image signal and a key value of each pixel which is sequentially inputted in a buffer memory;
    an alternate pixel value generations operation of generating an alternate pixel value of an image signal of an object pixel based on the key value of each pixel which is sequentially inputted;

a padding pixel location writing-in operation of writing information indicating a location of a padding pixel in a padding pixel location storing unit based on the key value of each pixel which is sequentially inputted; and a filtering operation of specifying a padding pixel by referring to the padding pixel location storing unit and performing a filtering processing to the specified padding pixel by using the alternate pixel value and the value of the image signal in the buffer memory.

26. A program embodied in a computer readable medium for use with a computer for smoothing a boundary between a background and an object by replacing a pixel value of a padding pixel, which was determined to be one of a background pixel and an object pixel, with an alternate pixel value in an image block including both background pixels and object pixels, the program comprising:

an image memory writing-in operation of writing a pixel value of a pixel in the image block in an image memory;

an alternate pixel value generation operation of generating the alternate pixel value and storing the alternate pixel value in an alternate pixel value storing unit;

a map generation operation of making a map indicating a location of a padding pixel in the image block and storing the map in a map storing unit; and a filtering operation of filtering a padding pixel in the image block with reference to the map by using the alternate pixel value as the pixel value of the padding pixel, wherein the map stores data of 1 bit for each pixel indicating whether or not each pixel is a padding pixel corresponding to a location of each pixel in the image block.

* * * * *

UNITED STATES PATENT AND TRADEMARK OFFICE
CERTIFICATE OF CORRECTION

PATENT NO. : 6,833,845 B2
APPLICATION NO. : 09/983398
DATED : December 21, 2004
INVENTOR(S) : Daisaku Kitagawa et al.

It is certified that error appears in the above-identified patent and that said Letters Patent is hereby corrected as shown below:

On the Cover Page
In section (57) Abstract, line 13, replace "Image" with --image--.

In column 24, line 43, replace "value and" with --value, and--.
In column 26, line 61, delete "or not".
In column, 27, line 25, replace "pixel, store" with --pixel, and store--.

Signed and Sealed this

Twenty-seventh Day of February, 2007

JON W. DUDAS
*Director of the United States Patent and Trademark Office*